US008548195B2

(12) United States Patent
Ai et al.

(10) Patent No.: US 8,548,195 B2
(45) Date of Patent: Oct. 1, 2013

(54) TRACKING METHOD AND DEVICE ADOPTING A SERIES OF OBSERVATION MODELS WITH DIFFERENT LIFE SPANS

(75) Inventors: Haizhou Ai, Beijing (CN); Yuan Li, Los Angeles, CA (US); Shihong Lao, Kyoto (JP); Takayoshi Yamashita, Kizugawa (JP)

(73) Assignees: Omron Corporation, Kyoto (JP); Tsinghua University, Beijing (CN)

( * ) Notice: Subject to any disclaimer, the term of this patent is extended or adjusted under 35 U.S.C. 154(b) by 821 days.

(21) Appl. No.: 12/664,588

(22) PCT Filed: Jun. 13, 2008

(86) PCT No.: PCT/CN2008/071299
§ 371 (c)(1),
(2), (4) Date: Mar. 26, 2010

(87) PCT Pub. No.: WO2008/151577
PCT Pub. Date: Dec. 18, 2008

(65) Prior Publication Data
US 2010/0195870 A1    Aug. 5, 2010

(30) Foreign Application Priority Data
Jun. 14, 2007  (CN) .......................... 2007 1 0109159

(51) Int. Cl.
*G06K 9/00*  (2006.01)
(52) U.S. Cl.
USPC .......................................... 382/103; 382/165
(58) Field of Classification Search
USPC ................. 382/100, 103–104, 106, 113, 118, 382/154, 165, 169–181, 190, 225, 281, 299; 348/113, 143, 169; 345/419, 589, 600; 380/201–203, 231–233; 705/51–53, 57–59; 713/193–194
See application file for complete search history.

(56) References Cited

U.S. PATENT DOCUMENTS

| | | | | |
|---|---|---|---|---|
| 5,805,733 A * | 9/1998 | Wang et al. | ................... | 382/232 |
| 6,591,146 B1 * | 7/2003 | Pavlovic et al. | ................ | 700/29 |
| 7,130,446 B2 * | 10/2006 | Rui et al. | ...................... | 382/103 |
| 8,234,129 B2 * | 7/2012 | Michon et al. | ................... | 705/3 |
| 8,265,349 B2 * | 9/2012 | Wang et al. | ................... | 382/118 |

(Continued)

FOREIGN PATENT DOCUMENTS

| | | |
|---|---|---|
| CN | 1811793 A | 8/2006 |
| CN | 1924894 A | 3/2007 |

(Continued)

OTHER PUBLICATIONS

Li, et al., "Robust Head Tracking based on Multi-State Particle Fiter" Proceedings of the 7th International conference on Automatic Face and Gesture Recognition Apr. 10-12, 2006 UK FG2006, IEEE, pp. 1-6.*

(Continued)

*Primary Examiner* — Hadi Akhavannik
*Assistant Examiner* — Mehdi Rashidian
(74) *Attorney, Agent, or Firm* — Dickstein Shapiro LLP

(57) ABSTRACT

The present invention relates to a tracking method and a tracking device adopting multiple observation models with different life spans. The tracking method is suitable for tracking an object in a low frame rate video or with abrupt motion, and uses three observation models with different life spans to track and detect a specific subject in frame images of a video sequence. An observation model I performs online learning with one frame image prior to the current image, an observation model II performs online learning with five frames prior to the current image, and an observation model III is offline trained. The three observation models are combined by a cascade particle filter so that the specific subject in the low frame rate video or the object with abrupt motion can be tracked quickly and accurately.

21 Claims, 13 Drawing Sheets

(a) Standard Particle Filter Tracking Method (b) Lukas-Kanade Optic Flow Field Tracking Method (c) Tracking Method of Present Invention

(56) References Cited

U.S. PATENT DOCUMENTS

| | | | |
|---|---|---|---|
| 2003/0229529 A1* | 12/2003 | Mui et al. | 705/8 |
| 2005/0188013 A1* | 8/2005 | Rui et al. | 709/204 |
| 2005/0210103 A1* | 9/2005 | Rui et al. | 709/204 |
| 2006/0222205 A1 | 10/2006 | Porikli et al. | |
| 2008/0063236 A1* | 3/2008 | Ikenoue et al. | 382/103 |
| 2008/0085048 A1* | 4/2008 | Venetsky et al. | 382/153 |
| 2008/0091471 A1* | 4/2008 | Michon et al. | 705/3 |
| 2010/0002908 A1* | 1/2010 | Miyamoto et al. | 382/103 |

FOREIGN PATENT DOCUMENTS

| | | |
|---|---|---|
| JP | 2007-513408 A | 5/2007 |
| JP | 2008-262331 A | 10/2008 |
| WO | WO 2005/050543 A1 | 6/2005 |

OTHER PUBLICATIONS

Li, et al., "Tracking in Low Frame Rate Video: A Cascade Particle Filter with Discriminative Observers of Different Lifespans." Computer Vision and Pattern Recognition, IEEE, pp. 1-8. Jun. 22, 2007.

L. Xu et al., "Online Real Boosting For Object Tracking Under Severe Appearance Changes and Occlusion." 2007 IEEE International Conference on Acoustics, Speech, and Signal Processing, Apr. 15-20, 2007, Honolulu, HI, USA, pp. I-925-I-928, Apr. 15, 2007.

* cited by examiner (a) Standard Particle Filter Tracking Method (b) Lukas-Kanade Optic Flow Field Tracking Method (c) Tracking Method of Present Invention (a) Cascade Particle Filter  (b) Cascade Detector Tracking with Color　　　Tracking with Standard　　　Tracking with Online
Histogram mean shift　　　　Particle Filter　　　　　　Learning Method Observation model I performs on-line learning.

Observation model II performs on-line learning.

TRACKING METHOD AND DEVICE ADOPTING A SERIES OF OBSERVATION MODELS WITH DIFFERENT LIFE SPANS

TECHNICAL FIELD

The present invention relates to a tracking method and a tracking device for well tracking an object in the low frame rate video or an object with abrupt motion, and more specifically, to a tracking method and a tracking device which combine multiple observation models with different life spans in a cascade particle filter mode to quickly determine a target state in large-scale state space.

BACKGROUND ART

It is a quite interesting problem to track an object with abrupt motion or to track a specific target in a low frame rate video.

For the reduction of hardware cost or because of the low frame rate of a video input source or low online processing speed (for an online real-time system, the processing speed limits the frame rate of input data), etc., a lot of practical application (such as a mini embedded system required for real-time processing, some monitoring application, etc.) requires processing of the low frame rate video. The low frame rate video is common, but difficult to process in tracking.

Tracking in the low frame rate video is essentially equivalent to tracking the object with abrupt motion. The majority of tracking algorithms depend on motion continuity. The particle filter (reference [1]) uses a motion model to predict object motion and direct sampling so as to limit the search range (the distribution range of particles) within a smaller subspace, but it is difficult to accurately predict a change in the position of the target when the target abruptly moves. Other tracking algorithms based on iterative optimization, such as the mean shift algorithm (reference [2]) and Lucas-Kanade feature point tracking algorithm (reference [3]), basically requires that feature areas to be tracked have a superposed part in two adjacent frames or are very close to each other. However, these assumptions are not deduced under the condition of the low frame rate video or the target with abrupt motion.

Some researchers take notice of this difficulty (although they possibly do not want to deal with the problem of tracking the low frame rate video on purpose), and they adopt some similar solutions, i.e. they all use a detector. K. Okuma, et al. (reference [4]) use a detector trained by Boosting to combine detecting results and zero-order or first-order motion models to serve as the trial distribution of the particle filter so as to remedy the defect of inaccuracy of motion prediction. Such mixed trial distribution is also adopted in other references (e.g. reference [5]), though it is not special for solving the problem in tracking the low frame rate video. F. Porilkli and O. Tuzel (reference [6]) expand the basic mean shift algorithm to optimize multiple kernels, and the determination of the kernels depends on a detector for background differential motion area. By using the algorithm, they can track pedestrians in 1 fps video, but the premise is that the video camera is fixed. The above ideas can come down to a search process of using an independent detector to direct some existing tracker under the condition of difficulty predicting target motion.

Another kind of method is "first detection and second connection" (references [7] and [8]). The kind of method has a potential for dealing with the problem in tracking the low frame rate video, because the kind of method performs full detection of the video firstly (sometimes tracking in a short time), and then connect detected objects or tracked fragments into a complete motion track according to motion smoothness or appearance similarity. Thus, the problems of motion prediction and imperative assumption of adjacency of objects in adjacent frames are avoided. The method however has defects such that first, the process is generally performed by offline processing, because it requires comprehensive consideration of the whole track; second, the speed can hardly attain real-time requirements, because a large amount of time-consuming detection operation is required, and consequently the background differential detection is basically adopted for higher speed so that the video camera also needs to be fixed.

The above two kinds of methods have a common characteristic that a rapid-enough detector to be applied in a large area (in the whole image space in most cases) is needed, which is because the detector is in a loosely-coupled relationship with the tracking algorithm in the methods.

Some other researchers adopt a multi-scale tracking algorithm with the fundamental idea of constructing an image pyramid according to input images so as to perform observation in different scale space (references [9], [10]), and thus a larger space range can be covered when searching in larger scale space, so that a target with abrupt motion can be processed. When processing the relationships between observed quantities of different scales, G. Hua, et al. adopt a Markov network to model state quantities of different scales (reference [9]), S. Birchfield directly adopts the result of the previous scale as an initial sample of the later scale search (reference [10]), and J. Sullivan, et al. design a layered sampling algorithm to combine the observation results of different scales (reference [11]). However, the multi-scale tracking algorithm uses the same observation mode on each scale essentially.

In addition, a new trend that has appeared in the field of tracking research recently is that the researchers increasingly introduce learning methods to the tracking algorithm. Some researchers propose that the tracking problem can be considered as a classification problem, and the purpose of classification is to classify tracked objects and background or other objects. The representative work in the field includes S. Avidan's Ensemble Tracking (reference [12]), and J. Wang's online construction of a Haar character classifier by using a particle filter (reference [14]), etc. The work indicates that the learning methods greatly enhance the distinguishing capability of the tracker and improve the tracking performance.

As stated above, although there are many references for tracking research, the majority of the existing methods cannot be well applied to the problem in real-time tracking at a low frame rate. The existing methods neither have high enough processing speed nor can process the discontinuity of changes in target positions and appearance caused by the low frame rate.

Tracking methods and detection methods have been two opposite extremes for a long time, i.e., the tracking method is established on the continuity hypothesis of various time sequences (including target positions, appearance, etc.), but the detection methods independently distinguish and locate targets of some specific classes in any environments without consideration for the context.

In the low frame rate video, the continuity of time sequences of targets may be weaker, and therefore the conventional tracking method is not competent. At the same time, the full detection in the whole image space takes a lot of time, and the detection cannot distinguish different targets because of not considering the time sequences of the video.

FIGS. 1(a) and (b) each shows an example of face tracking in 5 fps video by the conventional standard particle filter tracking method and the Lukas-Kanade optical flow field tracking method, and continuous four frame images are shown. It can clearly be seen from FIG. 1 that because the continuity of time sequences of the target face is weaker, neither the standard particle filter tracking method nor the Lukas-Kanade optical flow field tracking method can well track the target face.

DISCLOSURE OF THE INVENTION

The present invention is proposed for solving the problems in the prior art, and aims at providing a tracking method and a tracking device which combine multiple observation models with different life spans. The tracking method and the tracking device combine multiple observation models with different life spans in a cascade particle filter mode so as to quickly determine a target state in large-scale state space.

Specifically, the present invention has the core principles of combining the conventional detection algorithm and the tracking algorithm, and reducing the search range by capturing and using time sequence information in the video to precisely identify the target by the detection algorithms so that the distinguishing capability and the tracking speed of the algorithm are improved.

The principles of the present invention are realized by establishing and combining multiple observation models with different life spans. The life span refers to the learning period and the service period of an observation model. For example, the learning period and the service period of a template matching tracker updated per frame are each one frame, but that of a detector of offline training can be considered to have an infinite length. For the detector of offline training, as many samples as possible, which cover various conditions, are adopted, and once the training is completed, the detector is expected to be applied to various conditions in future. The application of the observation models with different life spans has advantages that the application of observation models with shorter life spans can quickly exclude non-targets by depicting specific characteristics of the targets in a short term, and the training cost is low because knowledge required for learning is not too much; and the application of observation models with longer life spans can more accurately grasp the characteristics of the targets and effectively prevent drift caused by excessive online updating.

A cascade particle filter is used to combine observation models with different life spans. A cascade detector is a welcome mode in the field of detection. Drawing lessons from the idea, it is combined with a commonly used frame particle filter in the field of tracking so as to solve the specific technical problem in tracking the low frame rate video.

According to one aspect of the present invention, a tracking method for specific subjects, which is suitable for the low frame rate video, is provided, and it tracks and detects the specific subject in the frame image of a video sequence by using m observation models with different life spans, wherein m is a natural number.

The tracking method for specific subjects includes the following steps:

(a) detecting a character part in a first frame image of a video sequence and obtaining an initial sample set including multiple specific subject samples by performing Gaussian random sampling around the detected character part;

(b) performing online learning or offline training on a $k^{th}$ observation model by using a $D_k$ frame image prior to an input $t^{th}$ frame image, wherein t is a natural number, representing the sequence number of the frame image; k is a natural number, representing the sequence number of the observation model; and $D_k$ is a natural number, representing a life span of the $k^{th}$ observation model;

(c) aiming at the $t^{th}$ frame image, orderly using the m observation models performing online learning or offline training to update a weight of specific subject samples;

(d) judging whether the weight of the samples finally updated by the $m^{th}$ observation model in step (c) exceeds a first preset threshold; if the weight of the samples finally updated exceeds a first threshold, outputs the weighted average of the sizes and positions of the sample set of the specific subject samples to be used as the size and the position of the specific subject in the current frame; if the weight of the samples updated does not exceed the first threshold, discards the candidate target; and (e) repeating the steps (b) to (d) to a $t+1^{th}$ frame image.

In the tracking method for specific subjects, it is preferred that the life span $D_k$ of the $k^{th}$ observation model is increased with increase of k.

In the tracking method for specific subjects, it is preferred that the set sample number aiming at the $k^{th}$ observation model is $N_k$; $N_k$ is a natural number and is decreased with increase of k.

In the tracking method for specific subjects, it is preferred that in step (b), previous m−1 observation models perform the online learning, and the $m^{th}$ observation model performs the offline training.

In the tracking method for specific subjects, it is preferred that three observation models are used, the online learning is perform on previous two observation models, and the offline training is performed on an observation model III.

In the tracking method for specific subjects, the process of performing the online learning on an observation model I includes the following steps:

(f) collecting positive example samples and counterexample samples from previous $D_1$ frame images, and (g) calculating various parameters adopted in the observation model I based on the collected positive example samples and counterexample samples.

In the tracking method for specific subjects, it is preferred that the observation model I is a Fisher linear discriminant classifier.

In the tracking method for specific subjects, it is preferred that the life span $D_1$ of the observation model I is one frame image.

In the tracking method for specific subjects, it is preferred that the observation model I adopts five Haar-like characters selected offline.

In the tracking method for specific subjects, it is preferred that the positive example samples are selected from images in an area near the tracked specific subject, and the counterexample samples are selected from images far away from the specific subject in an area which is around the tracked specific subject and is twice as large as the specific subject.

In the tracking method for specific subjects, the output of the observation model I smoothed by a Sigmoid function is:

$$p(z_1 \mid x) \propto \frac{1}{1 + \exp(-(w^T f(x) - \eta))},$$

wherein x represents the state variable of the tracked specific subject; $z_1$ represents the observed quantity adopted by the observation model I, w represents the projection weight vector of the Fisher linear discriminant classifier, f(x) represents the input 5-D character vector, and η represents the classification threshold.

In the tracking method for specific subjects, the process of performing the online learning on an observation model II includes the following steps:

(h) collecting positive example samples and counterexample samples from previous $D_2$ frame images, filtering the collected samples by using the observation model I, and using reserved samples as training samples;

(i) selecting the counterexample samples whose output likelihood is greater than a second threshold in the observation model II from the reserved counterexample samples;

(j) based on the selected counterexample samples and the reserved positive example samples, constructing a new Fisher linear discriminant classifier, and adding the new Fisher linear discriminant classifier to the original weak classifier set until the number of weak classifiers exceeds a maximum set value or the overwhelming majority of the counterexample samples can be excluded;

(k) selecting a weak classifier from the weak classifier set to form a strong classifier by a Discrete AdaBoost algorism, and (l) deleting unadopted weak classifiers in the preset frame from the weak classifier set.

In the tracking method for specific subjects, it is preferred that the life span $D_2$ of the observation model II is five frame images.

In the tracking method for specific subjects, the output of the strong classifier is:

$$b(x) = \frac{\sum_{q \in Q} \alpha_q \text{sign}(w_q^T f_q(x) - \eta_q)}{\sum_{q \in Q} \alpha_q},$$

wherein x represents the state variable of the tracked specific subject, Q represents the set of a selected group of weak classifiers, $\alpha_q$ represents the weight corresponding to any weak classifier q in Q, $w_q$ represents the LDA projection vector of weak classifier q, $f_q$ represents the character adopted aiming at the weak classifiers q, and $\eta_q$ represents the classification threshold aiming at the weak classifiers q.

In the tracking method for specific subjects, the output of the observation model II smoothed by the Sigmoid function is:

$$p(z_2 \mid x) \propto \frac{1}{1 + \exp(-b(x))},$$

wherein $z_2$ represents the observed quantity of the observation model II.

In the tracking method for specific subjects, it is preferred that the observation model III is formed by multiple strong classifiers obtained by learning of vector boosting algorisms.

In the tracking method for specific subjects, it is preferred that the observation model III is a dendritic multi-view face detector.

In the tracking method for specific subjects, the output of the observation model III is:

$$p(z_3 \mid x) \propto \frac{1}{1 + \phi_h \exp(-c)},$$

wherein $z_3$ represents the observed quantity of the observation model III, h represents the layer number of the last strong classifier through which the input sample x passes; $\phi_h$ represents the ratio of the prior probability of the counterexample samples corresponding to the strong classifier to the positive example samples, and is decreased with the increase of h, showing that the larger the layer number of the classifiers through which x passes, the higher the probability that $\phi_h$ belongs to positive examples is; and c represents the confidence level output by the last strong classifier through which x passes.

According to another aspect of the present invention, a tracking device for specific subjects, which is suitable for low frame rate video, is provided. The tracking device tracks and detects a specific subject in a frame image of a video sequence by using three observation models with different life spans.

The device for tracking a specific subject includes:

an initializing part which detects a character part in a first frame image of a video sequence, and obtains an initial sample set including multiple specific subject samples by performing Gaussian random sampling around the detected character part;

a tracking detection part which tracks and detects the position and size of a specific subject in an input $t^{th}$ frame image, wherein t is a natural number, representing the serial number of the frame image;

a determining output part which determines whether the detection result of the tracking detection part is the tracked specific subject; if yes, outputs a weighted average of the size and position of a sample set of the target samples to be used as the size and position of the target in the current frame; if not, discards the candidate target; and a storage part which stores the determining output result of the determining output part for tracking and detecting a next frame image, wherein the tracking detection part includes:

a first tracking part which performs online learning on an observation model I used in the frame image by utilizing $D_1$ frame images prior to an input $t^{th}$ frame image, and then updates the weight of $N_1$ samples in the $t^{th}$ frame image, wherein $D_1$ is a natural number, representing the life span of the observation model I, and $N_1$ is a natural number;

a second tracking part which performs online learning on an observation model II used in the frame image by utilizing $D_2$ frame images prior to the input $t^{th}$ frame image, and then updates the weight of $N_2$ samples in the $t^{th}$ frame image which are resampled based on the sampling weight updated by the first tracking part, wherein $D_2$ is a natural number, representing the life span of the observation model II, and $N_2$ is a natural number; and a third tracking part which performs offline training, and then updates the weight of $N_3$ ($N_3$ is a natural number) samples in the $t^{th}$ frame image which are resampled based on the sampling weight updated by the second tracking part, the determining output part judges whether the sampling weight finally updated by the third tracking part exceeds a preset first threshold; if it exceeds the first threshold, outputs the weighted average of the size and position of the sample set of the specific subject samples to be used as the size and position of the target in the current frame; if it does not exceed the first threshold, discards the candidate target.

In the tracking device for specific subjects, it is preferred that the life span $D_1$ of the observation model I is smaller than the life span $D_2$ of the observation model II.

In the tracking device for specific subjects, it is preferred that the life span $D_1$ of the observation model I is one frame image.

In the tracking device for specific subjects, it is preferred that the life span $D_2$ of the observation model II is five frame images.

In the tracking device for specific subjects, it is preferred that the sample number $N_1$ aiming at the first tracking part>the sample number $N_2$ aiming at the second tracking part>the sample number $N_3$ aiming at the third tracking part.

In the tracking device for specific subjects, the process of performing the online learning on the observation model I includes the following steps:

collecting positive example samples and counterexample samples from the previous $D_1$ frame images, and calculating various parameters adopted in the observation model I based on the collected positive example samples and counterexample samples.

In the tracking device for specific subjects, it is preferred that the observation model I is a Fisher linear discriminant classifier.

In the tracking device for specific subjects, it is preferred that the observation model I adopts five Haar-like characters selected offline.

In the tracking device for specific subjects, it is preferred that the positive example samples are selected from images in an area near the tracked specific subject, and the counterexample samples are selected from images far away from the specific subject in an area which is around the tracked specific subject and is twice as large as the specific subject.

In the tracking device for specific subjects, the output of the observation model I smoothed by a Sigmoid function is:

$$p(z_1 \mid x) \propto \frac{1}{1 + \exp(-(w^T f(x) - \eta))},$$

wherein x represents the state variable of the tracked specific subject, $z_1$ represents the observed quantity adopted by the observation model I, w represents the projection weight vector of the Fisher linear discriminant classifier, f(x) represents the input 5-D character vector, and $\eta$ represents the classification threshold.

In the tracking device for specific subjects, the process of performing the online learning on the observation model II includes the following steps:

collecting positive example samples and counterexample samples from previous $D_2$ frame images, filtering the collected samples by using the first tracking part, and using reserved samples as training samples;

selecting the observation model II whose output likelihood is greater than second threshold counterexample samples in the observation model II from the reserved counterexample samples;

based on the selected counterexample samples and the reserved positive example samples, constructing a new Fisher linear discriminant classifier, and adding the new Fisher linear discriminant classifier to the original weak classifier set until the number of weak classifiers exceeds a maximum set value or the overwhelming majority of the counterexample samples can be excluded;

selecting a weak classifier from the weak classifier set to construct strong classifiers by a Discrete AdaBoost algorism; and deleting unadopted weak classifiers in a preset frame from the weak classifier set.

In the tracking device for specific subjects, the output of the strong classifier is:

$$b(x) = \frac{\sum_{q \in Q} \alpha_q \mathrm{sign}(w_q^T f_q(x) - \eta_q)}{\sum_{q \in Q} \alpha_q},$$

wherein x represents the state variable of the tracked specific subject, Q represents the set of a selected group of weak classifiers, $\alpha_q$ represents the weight corresponding to any weak classifier q in Q, $w_q$ represents the LDA projection vector of weak classifier q, $f_q$ represents the character adopted aiming at weak classifier q, and $\eta_q$ represents the classification threshold aiming at weak classifier q.

In the tracking device for specific subjects, the output of the observation model II smoothed by the Sigmoid function is:

$$p(z_2 \mid x) \propto \frac{1}{1 + \exp(-b(x))},$$

wherein $z_2$ represents the observed quantity of the observation model II.

In the tracking device for specific subjects, it is preferred that the observation model III is formed by a plurality of strong classifiers obtained by learning of vector boosting algorisms.

In the tracking device for specific subjects, it is preferred that the observation model III is a dendritic multi-view face detector.

In the tracking device for specific subjects, the output of the observation model III is:

$$p(z_3 \mid x) \propto \frac{1}{1 + \phi_h \exp(-c)},$$

wherein $z_3$ represents the observed quantity of the observation model III; h represents the layer number of the last strong classifier through which the input sample x passes; $\phi_h$ represents the ratio of the prior probability of the counterexample samples corresponding to the strong classifier to the positive example samples, and is decreased with increase of h, showing that the larger the layer number of the classifiers through which x passes, the higher the probability that $\phi_h$ belongs to positive examples is; and c represents the confidence level output by the last strong classifier through which x passes.

The present invention constructs different classifiers as observation models and combines the online classifiers and the offline classifiers for use on the basis of statistic learning so as to improve the stability of the algorithms. The application of multiple complementary observation models in the same image space not only can enhance the distinguishing capability of the observation models, but also can avoid errors caused by down sampling images. Therefore, the tracking method and the tracking device can reduce the search range by capturing and using time sequence information in the video by aiming at a tracking target in low frame rate video or object with abrupt motion to precisely identify the object by detection algorithms so that the target or object can be rapidly and accurately tracked.

BEST MODE FOR CARRYING OUT THE INVENTION

The detailed description of the preferred embodiment of the present invention is given by taking a face and a head as examples with reference to the accompanying drawings in the following text. It should be noted that the method and the device provided by the present invention can also be applied to the tracking of targets of other types.

The principle of the present invention includes combining the conventional detection algorithm and the tracking algorithm, and reducing the search range by capturing and using time sequence information in video, then precisely identifying the target by the detection algorithms so as to improve the distinguishing capability and the tracking speed of the algorithm.

The principle of the present invention is realized by establishing and combining a series of observation models with different "life spans". It is preferred that three different observation models are adopted. For example, in the present invention, the observation model I adopts the Fisher linear discriminant classifier with a life span of only one frame; the observation model II adopts the Discrete AdaBoost algorithm and uses the Fisher linear discriminant classifier as a weak classifier, life span of which is, for example, five frames; the observation model III adopts an offline training detector which comprises a plurality of strong classifiers obtained by the learning of vector boosting algorithms (variety of Real AdaBoost), life span of which can be considered as infinite length. The observation model I uses the training samples obtained from the previous frame images to train model parameters and then updates the sampling weight in the current frame. According to the sampling weight updated by the observation model I in the current frame, a first newly preset number of samples are selected through a resampling process (in the present invention, importance sampling is adopted, i.e. the distribution of resampled samples is basically determined in proportion to the updated sampling weight so that the resampled samples are basically equal in weight). The observation model II uses the training samples obtained from the previous five frame images to train model parameters, and then updates the sampling weight in the current frame in the respect of the first preset number of samples obtained by the importance sampling according to the output results of the observation model I. According to the sampling weight updated by the observation model II in the current frame, a second newly preset number of samples are selected through a similar resampling process. The model parameters of the observation model III is well trained offline, so that the second preset number of samples obtained by the importance sampling according to the output results of the observation model II can be directly detected.

Figure 2:
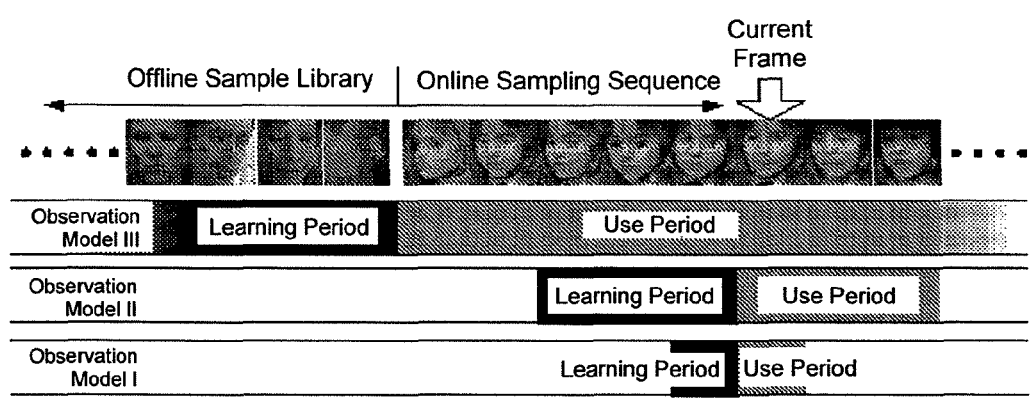
FIG. 2 shows a schematic diagram of the learning periods and the service periods of three observation models.

FIG. 2 shows a schematic diagram of the learning periods and the service periods of the three observation models. It can be seen that the learning period of the observation model I is just the previous frame image, and its service period is just the current frame image; the learning period of the observation model II is the previous several frame images, and the service period is the subsequent several frame images correspondingly; the observation model III is offline trained, and therefore the service period of the observation model III corresponds to the whole online sampling sequence.

The method has advantages that when using the observation model with shorter life span, it can quickly exclude non-targets by depicting the specific characteristics of the targets in a short term since using, and its training expense is smaller because of little knowledge to be learned; when using the observation model with longer life span, it can accurately grasp the characteristics of the targets and effectively prevent "drift" caused by excessive online updating.

The above contents summarize the cascade particle filter which combines the three observation models with different life spans. It should be noted that the number, types and life spans of the observation models are not limited to the above examples; they can be changed according to conditions.

Detailed description of preferred embodiments of the present invention is given below.

First, variable symbols related to the algorithm of the present invention are described.

The state of a target at t moment is defined as a hidden variable $x_t$, and the corresponding observed quantity is $z_t$. Herein, on the premise of no ambiguity, the subscript t is omitted.

By taking face tracking as an example, define x=(x, y, s), i.e. face position and size. The function of the observation models is to output p(z|x) for each x. Under the condition of adopting m observation models, define $z=\{z_1, \ldots, z_m\}$, and record the output of the $k^{th}$ observation model as $p(z_k|x)$.

Each of the observation models relates to the following factors: learning algorithm L, training sample set S, training character set F and several time complexities of the observation model (offline training complexity $\tau_{off}$, online training complexity $\tau_{on}$ and classification complexity $\tau_{test}$) Wherein, the classification complexity is defined as time complexity of calculating p(z|x) with an input x. The $k^{th}$ observation model can be represented as follows:

$$O_k = (L_k, F_k, S_k, \tau_{k,on}, \tau_{k,off}, \tau_{k,test})$$

The total time complexity for training is $(\tau_{k,on}+\tau_{k,off})$ and increases with the scales of $|F_k|$ and $|S_k|$. The classification complexity $\tau_{k,test}$ is related to the complexity of the classification model and the scale of the character set $\acute{F}_k$ used for classification and included in the classification model finally.

For reducing the online time complexity of the tracking algorithm as much as possible, it is preferred that different observation models are arranged in the mode of progressive increase in the life span because the training complexity $(\tau_{k,on}+\tau_{k,off})$ and the classification complexity $\tau_{k,test}$ of the observation model with longer life span are also high. If the learning period is longer, the number $|S_k|$ of training samples is larger so that a larger character set $F_k$ and a more complicated learning algorithm $L_k$ are needed to learn information included in $S_k$, and thus the character set $\acute{F}_k$ used for classification finally selected by the observation model I is larger.

Based on the analysis above, in the present invention, different observation models are arranged in a progressive increase mode of the life span. Simultaneously, for reducing the online learning complexity, $F_k$ must be elaborately selected to limit the scale, and offline training is used as much as possible. Different observation models adopt different configuration (including classifier form, learning algorithm, character set, etc.) to comprehensively consider classification capability and classification speed. In other words, each learning algorithm $L_k$ and alternative character set $F_k$ should ensure that the observation models reach a certain distinguishing capability after learning the training sample $S_k$ without excessive complexity and increase of time complexity. Table 1 lists the basic configuration of three observation models adopted by the preferred embodiment of the present invention.

TABLE 1

Configuration of All Observation Models

| k | 1 | 2 | 3 |
|---|---|---|---|
| $L_k$ | 5-D Fisher linear classifier | Discrete AdaBoost, based on Fisher linear weak classifier set $Q_0$ | Real AdaBoost, based on piecewise linear weak classifiers |
| $F_k$ | five Haar-like characters selected in advance | fifty Haar-like characters selected in advance | tens of thousands of Haar-like characters |
| $|\acute{F}_k|$ | five characters | about fifty characters | about 500 characters per face pose |
| $S_k$ | sample collected from the previous frame | samples collected from the previous five frames (through the observation model I) | tens of thousands of offline samples |
| $\tau_{k,on}$ | $O(|F_1|^2|S_1|)$ | $O(|F_2|^2|S_2|+|S_2||Q_0|^2)$ | 0 |
| $\tau_{k,off}$ | negligible | negligible | several days |
| $\tau_{k,test}$ | $O(|\acute{F}_1|)$ | $O(|\acute{F}_2|)$ | $O(|\acute{F}_3|)$ |

Figure 3:
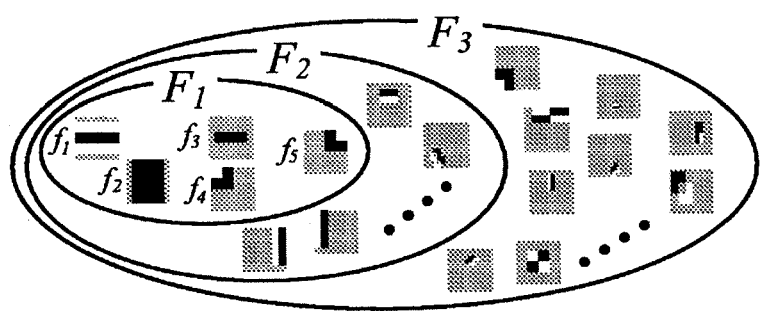
FIG. 3 shows the coincidence condition of the character sets adopted by three observation models.

Before respectively describing the particular construction methods of the three observation models, firstly introduce character sharing among all observation models, as shown in FIG. 3.

The present invention uses an extended set (reference [15]) of Haar-like characters (reference [13]). The calculation of the Haar-like characters is highly effective, but the premise is that integral images of first-order and second-order have been calculated on each scale of an image pyramid. The process of calculating integral images is a big part of expense for a real-time system, so all observation models adopt Haar-like characters in the present invention. The training character set $F_k$ of each observation model I is selected in advance through offline samples. Because of only using the Haar-like characters, the observation models can work just with gray level images.

Detailed description of all observation models is given below.

Observation Model I

The observation model I adopts a Fisher linear discriminant classifier (i.e. Linear Discriminant Analysis). Its life span is the shortest (one frame), and in other words, the training samples are all from the previous frame image. Because of relatively simple distribution of training samples, we only use five Haar-like characters to perform classification so as to perform the function of quickly excluding non-targets.

The Fisher linear discriminant classifier distinguishes positive example samples (face samples) and counterexample samples (non-face samples) by projecting character vectors to the direction which is the most suitable for classification. Herein, 5-D character vectors will be projected into 1-D. Set the projection weight vector of the Fisher classifier as w, inputted 5-D character vector as f(x) and classification threshold as η (regarding methods of the weight vector and the threshold, refer to reference [18]). The output of the classifier is $w^T f(x) - \eta$. Finally, the output value of the observation model is smoothed by the Sigmoid function:

$$p(z_1 | x) \propto \frac{1}{1 + \exp(-(w^T f(x) - \eta))}$$

The training samples of the observation model I are selected from the previous frame, the positive example samples are selected from images in the area near the tracked specific subject, and the counterexample samples are selected from images far away from the specific subject in the area which is around the tracked specific subject and is twice as large as the specific subject. The observation model I has no process of online character selection. The reasons are that on one hand, character selection takes much time, on the other hand, training samples are relatively limited (only from the previous frame) for avoiding over-fitting. Therefore, the adopted five Haar-like characters are all selected in an offline mode (refer to $F_1$ in FIG. 3). The selection standard is the distinguishing capability of the characters on the offline sample set (Fisher Linear Discriminant).

Observation Model II

In order to obtain stronger distinguishing capability, the observation model II adopts the Discrete AdaBoost algorithm (reference [16]), using Fisher linear discriminant classifiers as weak classifiers. The observation model II has longer life span than that of the observation model I. Training samples are selected from the input data of the latest five frames. The positive example and counterexample training samples in the five frames are set as $S_2=(S_{2,pos}, S_{2,neg})$ according to the sample collecting standards mentioned above.

One candidate set $Q_0$ of the weak classifiers is always held in the tracking process. On one hand, new weak classifiers can be continuously added according to the new sample; on the other hand, one of subsets is selected by AdaBoost, and is weighted to form a strong classifier. Due to the existence of the candidate set of the weak classifiers, data included in the observation model II covers changes of the target in the latest time period. The online training process of the observation model II mainly includes the following steps:

1. adding new weak classifiers to the candidate set $Q_0$ of the weak classifiers;
2. selecting the weak classifiers from the candidate set $Q_0$ of the weak classifiers with the Discrete AdaBoost algorithm and forming the strong classifiers;
3. deleting the weak classifiers which were not selected in a period of time from the candidate set $Q_o$ of the weak classifiers.

Further description of the steps is given below.

In Step 1, new weak classifiers are added. The mode of continuously filtering counterexample samples is adopted, i.e. the counterexample samples which can be excluded by the new weak classifiers are removed from the training samples while the new weak classifiers are generated, then new weak classifiers continue to be added until the counterexample samples are few enough or the number of the new weak classifiers exceeds the preset maximum number.

In Step 2, the weak classifiers in the candidate set of the weak classifiers are selected and weighted so as to form strong classifiers with the standard Discrete AdaBoost algorithm. The algorithm is over when the error rate is approximate to 0 or all weak classifiers in the candidate set $Q_0$ of the weak classifiers have been selected already.

The result of online learning is a strong classifier formed by a group of weak classifiers Q, which has corresponding weak classifier weight $\alpha_q$ for any one of the weak classifiers $q \in Q$, and the LDA projection vector, the adopted characters and the classification thresholds $(w_q, f_q, \eta_q)$ of the weak classifiers. The output of the strong classifier can be calculated as follows:

$$b(x) = \frac{\sum_{q \in Q} \alpha_q \mathrm{sign}(w_q^T f_q(x) - \eta_q)}{\sum_{q \in Q} \alpha_q}$$

Similarly, the output value of the observation model II can be smoothed by the Sigmoid function, providing the following formula:

$$p(z_2 \mid x) \propto \frac{1}{1 + \exp(-b(x))}$$

Observation Model III

The observation model III adopts an offline training detector. It has the most complicated structure, includes maximum information, and is used for mutually supplementing the information obtained through online learning in the tracking process and restraining the online observation models so as to prevent the online observation models from deviating from the actual distribution of the target.

The adopted offline detector is formed by the strong classifiers obtained by learning of multiple vector boosting algorithms (Vector Boosting) (a variation of Real AdaBoost).

Structurally, the observation model I is a weak classifier, the observation model II is a strong classifier obtained by Boosting, and the observation model III is formed by connecting multiple strong classifiers. The observation model III directly adopts a dendritic multi-view face detector (see reference [20]) particularly for tracking faces. As for how to obtain the observation likelihood $p(z_3|x)$, please see reference [17], we will not give details here, and we only represent the output of observation model III as follows:

$$p(z_3 \mid x) \propto \frac{1}{1 + \phi_h \exp(-c)}$$

wherein h represents the layer number of the strong classifier through which an input sample x passes finally; $\phi_h$ represents the ratio (recorded in the training process) of the prior probability of the counterexample samples corresponding to the strong classifier to the positive example samples, and is decreased while h is increased, showing that the larger the layer number of the classifier through which x passes, the stronger the probability that $\phi_h$ belongs to positive examples (faces) is; and c represents the confidence level output by the last strong classifier through which x passes.

The adopted learning methods (Fisher linear discriminant/LDA, Discrete AdaBoost, Real AdaBoost, etc.) are all classical algorithms. However, when selecting learning methods for each observation model, we have comprehensively considered the complicated degree of the learning target, the time consumption of training and classification, etc. and performed a mass of experiments. For example, although both the observation model II and the observation model III adopt the Boosting algorithm, they have obvious differences that the scale of the candidate set of the weak classifiers adopted in the observation model II is far smaller than that of the candidate set of the weak classifiers adopted in the observation model III, i.e. the former only includes tens of weak classifiers, but the latter includes more than ten thousands or even more than millions of weak classifiers; in addition, the observation model II uses Discrete AdaBoost, but the observation model III uses Real AdaBoost. On one hand, it is for reducing the time consumption of online training (because the time complexity of Discrete AdaBoost is about $O(|S||Q_0|^2)$, wherein |S| represents the number of training samples, and $|Q_0|$ represents the number of the candidate weak classifiers), on the other hand, it is also for avoiding the over-fitting of relatively less online training samples. Besides, in order to increase the distinguishing capability of the observation models and accelerate algorithm convergence in the premise of restricting the number of the weak classifiers, the observation model II selects a 10-D Fisher linear discriminant classifier as the weak classifier to increase the distinguishing capability of single weak classifier so as to increase the efficiency of algorithms; but the observation model III adopts a Haar-like character to form one weak classifier.

Cascade Particle Filter

We firstly introduce a standard particle filter and analyze the defects of the standard particle filter under the condition of low frame rate or abrupt motion before the detailed description of the cascade particle filter according to the present invention.

Definitions of state quantity and observed quantity are still continued to be used, the purpose of the particle filter is to calculate $p(x_t|Z_t)$, mainly including the following steps:

$$\text{prediction: } p(x_t|Z_{t-1}) = \int p(x_t|x_{t-1})p(x_{t-1}|Z_{t-1})dx_{t-1}; \quad (1)$$

$$\text{updating: } p(x_t|Z_t) \propto p(y_t|z_t)p(x_t|Z_{t-1}) \quad (2)$$

The integral term in the formula is calculated in the mode of importance sampling, that is to say, random particles should be produced from the trial distribution.

Figure 1:
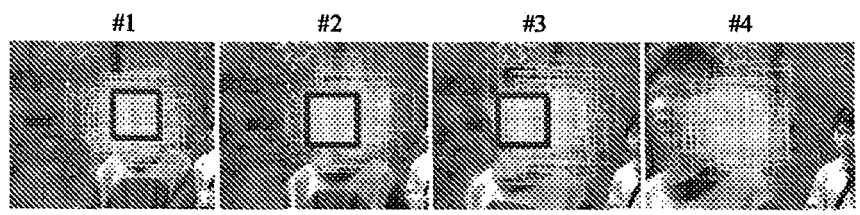
FIGS. 1(a), (b) and (c) respectively show the effects of tracking objects in low frame rate video by the standard particle filter tracking method, the Lukas-Kanade optical flow field tracking method and the tracking method of the present invention.
Figure 1:
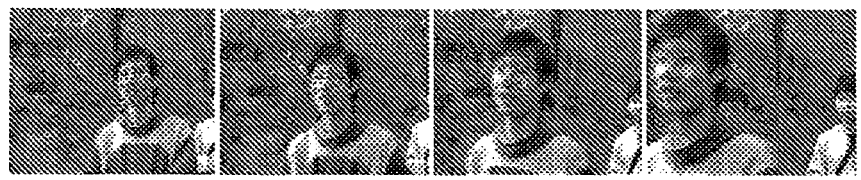
Figure 1:
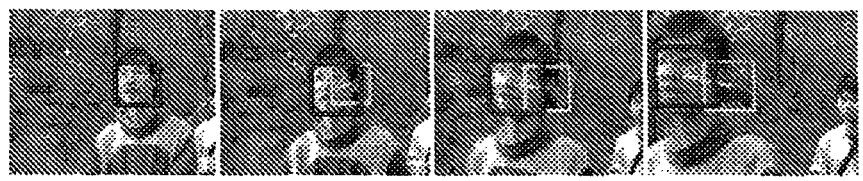

Generally, the trial distribution directly adopts $p(x_t|x_{t-1})$; but when the target moves intensely and irregularly (for example, in the low frame rate video), $p(x_t|x_{t-1})$ is often far away from the actual motion of the target so that adopting such trial distribution can cause the particle set to gradually deviate from the actual target state, and finally lead to tracking failure (see the example shown in FIG. 1(a)). The remedy is to increase the uncertainty of $p(x_t|x_{t-1})$ (for example, increase the variance of a Gaussian model), but the quantity of particles needs to be increased simultaneously, which reduces the efficiency.

The other method is to introduce the observation distribution $p(z_t|x_t)$ into the trial distribution (see references [4] and [5]) to assist the prediction of the motion model, which requires calculating $p(z_t|x_t)$ in the state space of a very large range.

Therefore, no matter which method is adopted, the $p(z_t|x_t)$ will be calculated in a large area. Calculating the observation likelihood is always the part costing most of the time in the system, which always exists if only single observation model is used. But the present invention adopts the cascade particle filter relating to multiple observation models so as to overcome the defects of the standard particle filter at a certain extent.

The description of the algorithm of the cascade particle filter of the present invention is as follows:

Record the observed quantity as $z=\{z_1, \ldots, z_m\}$, assume that different observed quantities are mutually independent, and obtain $$p(z|x) = p(z_1, \ldots, z_m|x) = \prod_{k=1}^{m} p(z_k|x)$$

The standard particle filter can directly use $$\prod_{k=1}^{m} p(z_k|x)$$

to update the particle weight. Under the condition, not only the calculation quantity is large, but also the weight of a large amount of particles may be small (close to 0) finally, so that sampling efficiency is low. A comparison experiment based on "Effective Sample Size" (see reference [19]) will be carried out later.

Therefore, the cascade particle filter is widely used in detection for solving similar problems. However, the cascade particle filter can be regarded as an extremely special case here, i.e. the value of $p(z_k|x)$ is 0 or 1, x finally satisfying $p(z|x)>0$ is output as the detection result, while x not meeting $p(z|x)>0$ is excluded as a counterexample. Besides, the detector searches the target in the images in the mode of exhaustion, just like particles are uniformly spread in the whole state space of x.

In order to overcome the defects of the standard particle filter and the cascade particle filter, the present invention combines the advantages of the standard particle filter and the cascade particle filter, and connects multiple different observation models through importance sampling for many times. Assume:

$$\pi_0(x_t) = p(x_t|Z_{t-1})$$

$$\pi_k(x_t) = p(z_{k,t}|x_t)\pi_{k-1}(x_t), k=1 \ldots m$$

thereby infer:

$$\pi_m(x_t) = p(x_t|Z_{t-1})\prod_{k=1}^{m} p(z_{k,t}|x_t)$$

$$= p(x_t Z_{t-1})p(z_t|x_t) = p(x_t|Z_t)$$

this distribution is the tracking target.

The particular algorithm is as follows:

A weighted particle set simulating $\pi_k(x_t)$ distribution is obtained through importance sampling in the $k^{th}$ turn. $\pi_{k-1}(x_t)$ is used as the trial distribution, and the weighted particle set conforming to the trial distribution has been obtained in the k−1 turn already, namely $P_{k-1,t}=\{x_{k-1,t}^{(i)}, w_{k-1,t}^{(i)}\}_{i=1}^{N_{k-1}} \sim \pi_{k-1}(x_t)$. Therefore, sampling from the trial distribution is equivalent to resampling the particle set $P_{k-1,t}$ to obtain $\{X_{k,t}^{(i)}, 1/N_k\}_{i=1}^{N_k}$. While the weight of $x_{k,t}^{(i)}$ should be updated according to the following formula:

$$w_{k,t}^{(i)} = \frac{\pi_k(x_{k,t}^{(i)})}{\pi_{k-1}(x_{k,t}^{(i)})} = p(z_{k,t}|x_{k,t}^{(i)})$$

$P_{k,t}=\{x_{k,t}^{(i)}, w_{k,t}^{(i)}\}_{i=1}^{N_k}$ can be regarded as the approximate value of $\pi_k(x_t)$. $P_{m,t}=\{x_{m,t}^{(i)}, w_{m,t}^{(i)}\}_{i=1}^{N_m} \sim \pi_m(x_t)=p(x_t|Z_t)$ can be obtained by repeating the steps m times.

Figure 4:
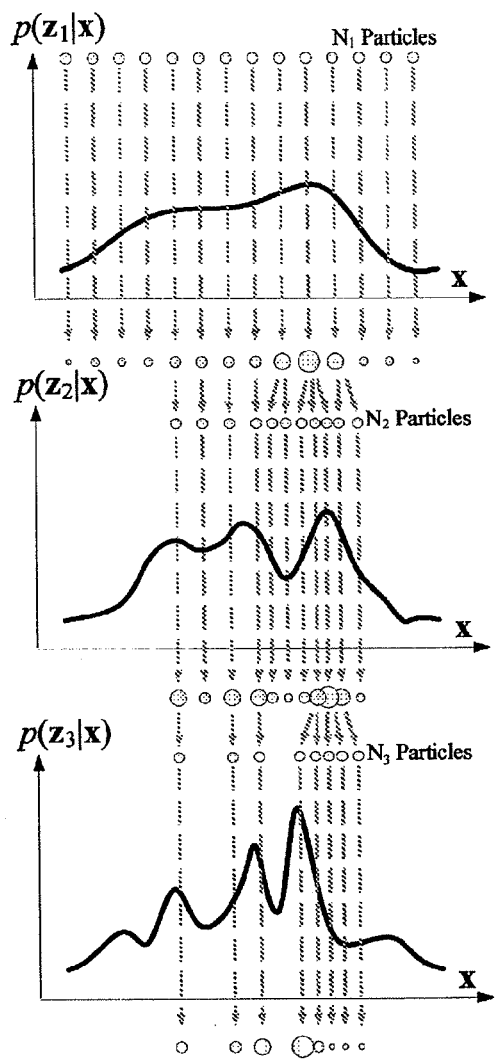
FIG. 4 shows the comparison between the cascade particle filter and the traditional cascade detector.
Figure 4:
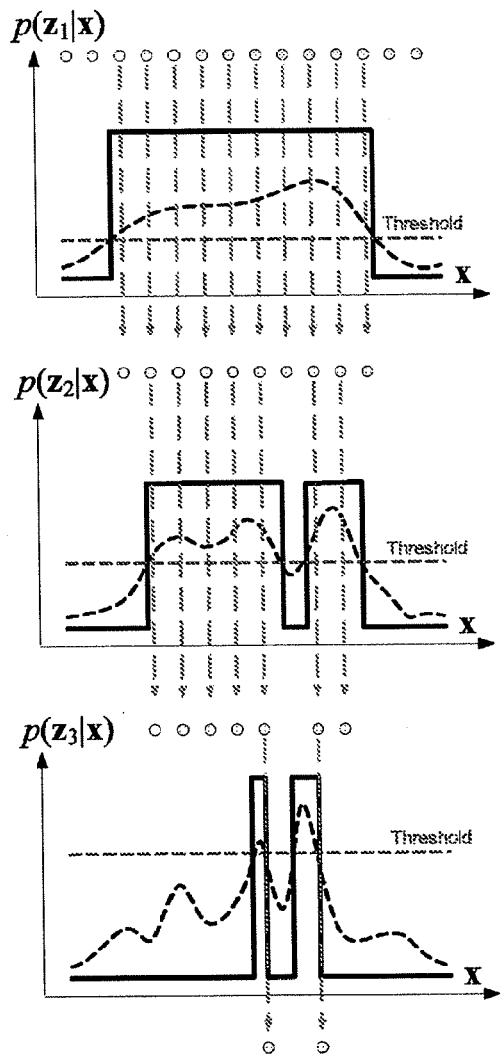

FIG. 4 shows the comparison between the cascade particle filter and the traditional cascade detector, assuming both the cascade particle filter and the traditional cascade detector adopt three observation models/classifiers.

Table 3 shows the further comparison among the standard particle filter, the cascade detector and the cascade particle filter.

TABLE 3

Comparison among the Standard Particle Filter, the Cascade Detector and the Cascade Particle Filter ($\tau_{k,test}$: time consumption for calculating $p(z_t|x_t)$; $N_k$ or $N_k'$: particle number in the $k^{th}$ turn or sample number passing the detection)

| Method | Time Complexity | Remarks |
| --- | --- | --- |
| Standard Particle Filter | $N \sum_{k=1}^{m} \tau_{k,test}$ | When N is large enough, accurate tracking can be achieved; but the time complexity is far larger than that of other two methods at this moment. |
| Cascade Detector | $\sum_{k=1}^{m} N_k' \tau_{k,test}$ | The size of $N_1' > N_2' > \ldots > N_m'$, $N_k'$ depends on the fixed through threshold; the object to be detected is generally uniformly selected (exhaustion) in the image space. |
| Cascade Particle Filter | $\sum_{k=1}^{m} N_k \tau_{k,test}$ | $N_1 > N_2 > \ldots > N_m$, $N_k$ is fixed so that the number of particles reserved in each layer can be controlled so as to play the role of a dynamic threshold in real time. All particles in each layer pass through the processes of weight updating, resampling and random disturbance. |

During the implementation, it is found that the output of the observation model $p(z_k|x)$ includes noise and is in multimodal distribution (see FIG. 5(a)), which is normal for distinguishing models; besides, positions of peak output by several observation models may be not overlapped. The phenomenon causes difficulties for the cascade detector or similar methods using multiple observation models (for example, C. Yang, et al. adopt the method of directly discarding a part of low-weight samples and reserving strong-weight samples at each time, see reference [21]).

However, the algorithm of the present invention can easily overcome such defects just by adding small Gaussian disturbance in the importance sampling at each time.

The tracking method adopting the cascade particle filter according to the present invention will now be described with reference to FIGS. 12, 13, 14 and 15.

Figure 12:
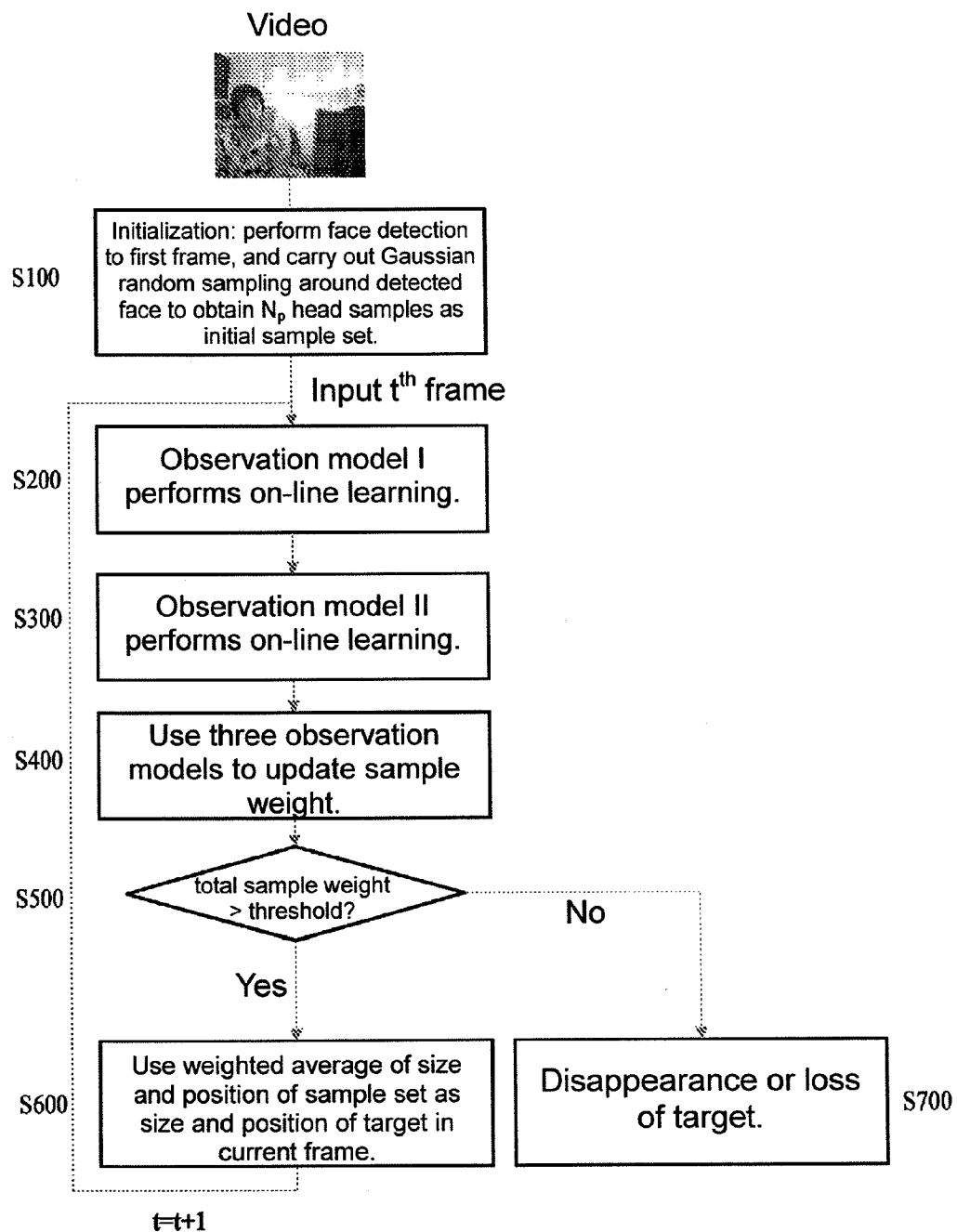
FIG. 12 shows an overview flowchart of the tracking method of the present invention.

FIG. 12 shows an overview flowchart of the tracking method of the present invention.

First, in step S100, initialization is carried out, and the face detection is performed on the first frame image, then Gaussian random sampling is performed around the detected faces to obtain $N_p$ head samples as an initial sample set. Engineers in the field also should know that other random sampling modes besides the Gaussian random sampling mode can be used to obtain the initial sample set.

Figure 13:
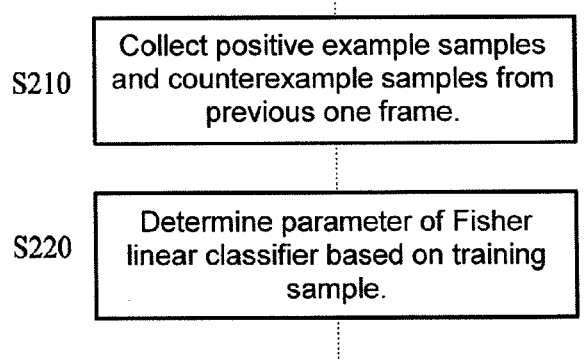
FIG. 13 shows a flowchart of the process that the observation model I performs online learning.

In step S200, online learning is performed on the observation model I by utilizing the one frame image prior to the $t^{th}$ inputted frame image. The particular process is shown in FIG. 13.

Figure 14:
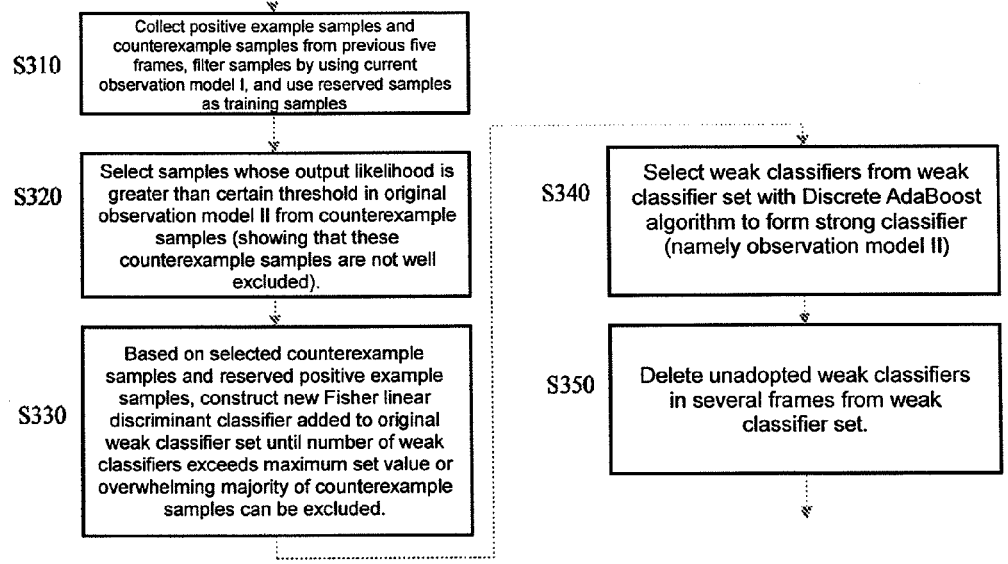
FIG. 14 shows a flowchart of the process that the observation model II performs online learning.

In step S300, online learning is performed on the observation model II by utilizing the five frame images prior to the $t^{th}$ inputted frame image. The particular process is shown in FIG. 14.

Figure 15:
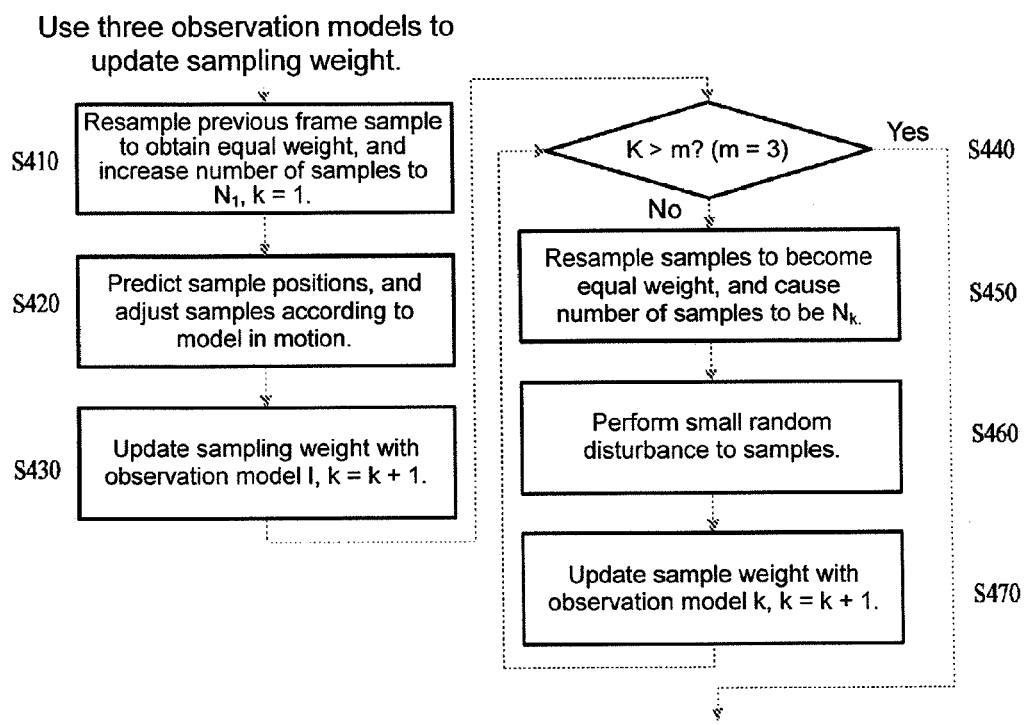
FIG. 15 shows a flowchart of updating the sampling weight by utilizing the observation models according to the tracking method of the present invention.

In step S400, the weight of appointed samples of different quantities is updated by orderly utilizing the observation model I and II on which online learning is performed, and the observation model III on which offline training is performed. FIG. 15 shows the particular process of updating the weight.

In step S500, whether the sampling weight finally updated in step S400 is larger than the appointed threshold is determined. If yes, step S600 is executed; here, the weighted average of the size and the position of the target sample is outputted and used as the size and the position of the target in the current frame, and subsequently the next frame image continues to be processed; if not, step S700 is executed, and the candidate target is discarded.

FIG. 13 shows the particular process of performing online learning to the observation model I.

In step S210, positive example samples (faces) and counterexample samples (non-faces) are collected from the one frame image prior to the $t^{th}$ frame image.

In step S220, the model parameters of the observation model I are determined according to the positive example samples and the counterexample samples collected in step S210.

FIG. 14 shows the particular process of performing online learning to the observation model II.

In step S310, first, the positive example samples and the counterexample samples are collected from the five frame images prior to the $t^{th}$ frame image, the collected samples are filtered by using the observation model I, and the reserved samples are used as the training samples.

In step S320, the counterexample samples whose output likelihood is greater than the appointed threshold in the original observation model II are selected from the reserved counterexample samples (This indicates that the counterexample samples are not properly excluded).

In step S330, based on the selected counterexample samples and the reserved positive example samples, a new Fisher linear discriminant classifier is constructed, and added to the original weak classifier set until the number of weak classifiers exceeds the maximum set value or the overwhelming majority of the counterexample samples can be excluded;

In step S340, the weak classifiers are selected from the weak classifier set by utilizing the Discrete AdaBoost algorithm so as to form the strong classifier, i.e. updating of the observation model II.

In step S350, the weak classifiers unadopted in the frames of preset number are deleted from the weak classifier set.

FIG. 15 shows the particular process of orderly updating the sampling weight by utilizing the observation models.

First, in step S410, the samples of the $t-1^{th}$ frame image are resampled so as to equalize the samples in weight and increase sample number to $N_1$, and parameter k=1 is set.

Next, in step S420, based on $N_1$ samples resampled from the $t-1^{th}$ frame image, positions of samples in the $t^{th}$ frame image are predicted by utilizing the motion models, and the samples are adjusted.

In step S430, the weight of $N_1$ samples in the $t^{th}$ frame image is updated by utilizing the observation model I, and k increases by 1.

In step S440, whether parameter k is larger than the appointed number m of the observation models is determined. If yes, the process is ended; if not, step S450 is executed.

In step S450, according to the updated sampling weight of the last observation model, based on the newly set number $N_k$ of the samples, the samples corresponding to the last observation model are resampled so that the resampled samples are equal in weight and the sample number becomes $N_k$.

In step S460, small random disturbance is performed on the samples resampled in step S450 by utilizing the Gaussian model.

In step S470, the weight of samples on which random disturbance is performed in step S460 is updated by utilizing the observation model k, k is increased by 1, and then the process is returned to step S440.

The introduction of the effect of the tracking method of the present invention is given below.

As an example, the tracking method of the present invention is realized by adopting the C++ programming language with the running velocity about 30 fps (a video frame of 320×240 pixel, single target) and hardware configuration including Pentium 2.8 GHz CPU. Numbers of particles adopted for sampling in each turn are respectively 3000, 600 and 200, and other particle numbers also can be adopted.

FIG. 5(a) shows the sampling process when some frame image is processed for clarifying the algorithms of the present invention.

Figure 5:
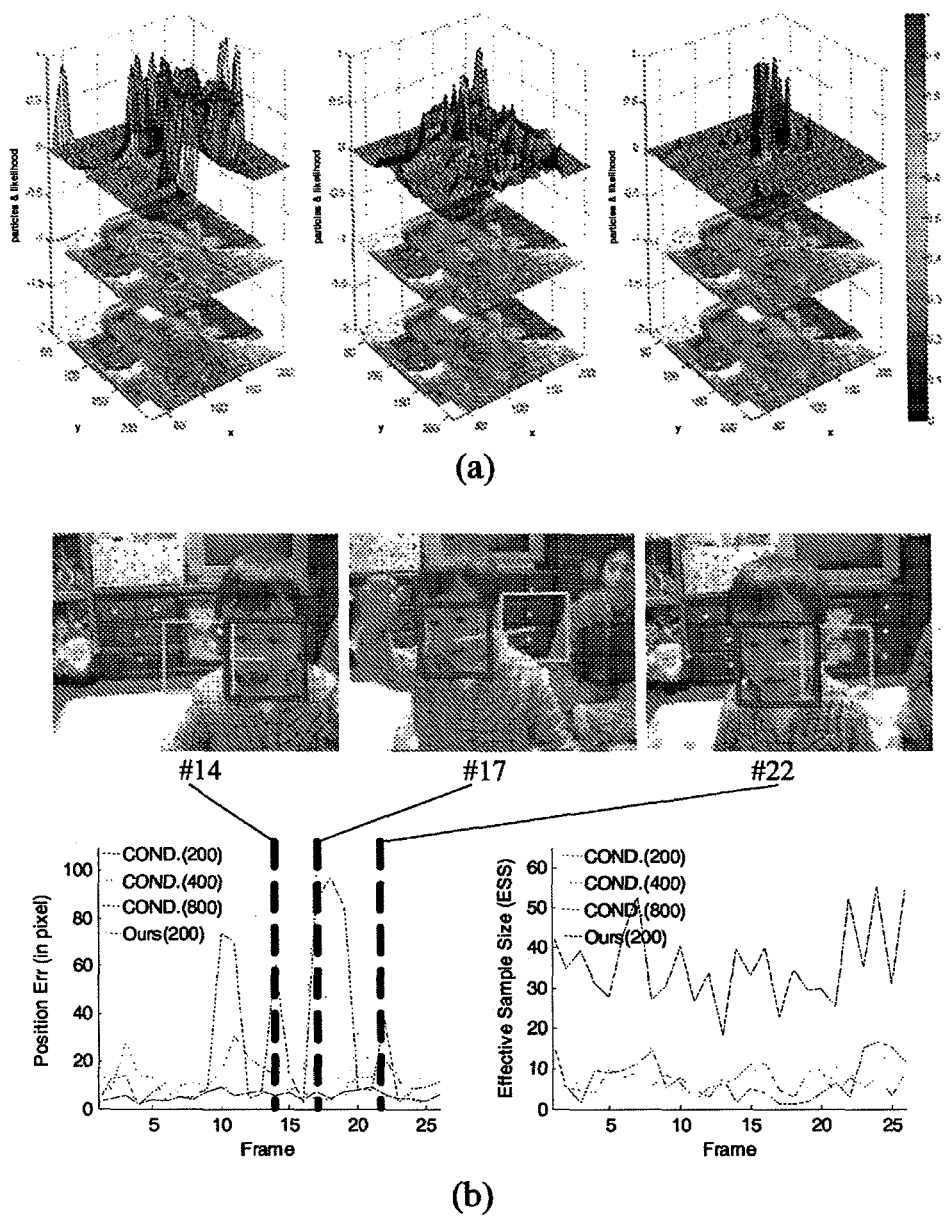
FIG. 5 shows the working process of the cascade particle filter, the tracking error rate curve and the sampling efficiency of the standard particle filter and the cascade particle filter, wherein (a) shows the particle distribution after the updating of observation likelihood and weight in each sampling process, (b) shows the tracking error rate curve and the effective sample size (ESS) curve of the standard particle filter and the cascade particle filter, and the tracking results of the cascade particle filter (the standard particle filter is used for tracking the frame with large deviation. The light gray rectangular frame represents the target position in the previous frame, which is convenient for observation of intensity of motion)

As mentioned above, the more complicated the observation models, the sharper the peak of the function of the observation likelihood is. The result is that the particles are intensively distributed around the peak after each-turn resampling. In addition, the outputs of the observation model II and III are not smooth even if the outputs are near the actual position of the target so that it is necessary to add small disturbance when resampling is performed. FIG. 5 (b) includes a comparison of sampling efficiencies, and the comparison objects are the standard particle filter and the cascade particle filter using different particle numbers. The figure shows a tracking error curve and an effective sample size curve. For the tracking error curve, increasing the particle number of the standard particle filter can improve the effect of tracking an object with abrupt motion at some extent, because more particles can cover larger range (compare curve using 800 particles with that using 200 particles). The method of the present invention has lower tracking errors, while its sampling efficiency is higher on the other hand. For the algorithm relevant to importance sampling, there is a general rule, effective sample size (ESS), and is used for measuring the sampling efficiency (reference [19]); ESS is calculated as follows:

$$ESS(N)=N/(1+cv^2(w))$$

wherein N represents the number of actually used particles, and $cv^2$ (w) represents variance coefficients calculated before the sampling weight is standardized. The effective sample size can be visually defined as that the description force of N weighted samples is equivalent to that of ESS(N) samples sampled from the target distribution. This shows that the larger the ESS(N), the stronger the description force of the sample set. In FIG. 5 (b), increasing the sample number of the standard particle filter cannot increase the sampling efficiency (especially, ESS(N) is lower in the frame with larger tracking errors); but the algorithm of the present invention reaches higher sampling efficiency.

Figure 6:
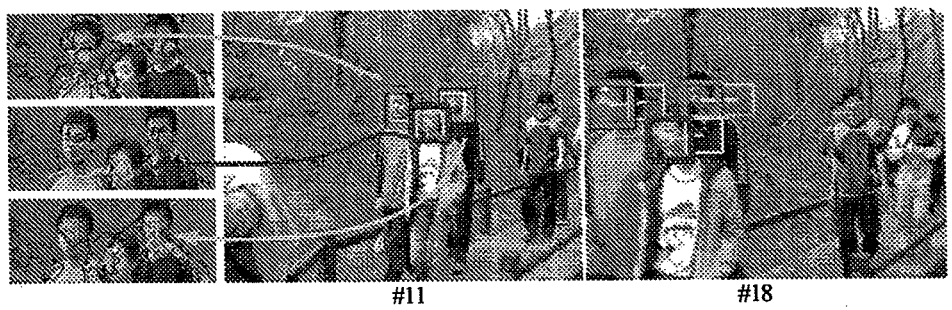
FIG. 6 shows the observation likelihood of the output of the online model of different targets in the tracking of multiple targets, wherein the light grey rectangular frame represents the target position of the previous frame.
Figure 9:
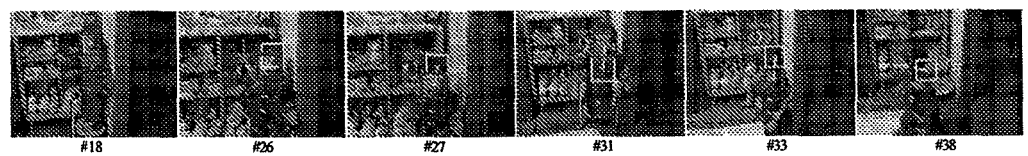
FIG. 9 shows the condition of tracking the target by the method of the present invention under the condition of adverse illumination condition, video camera with motion, and stretched lens.
Figure 10:
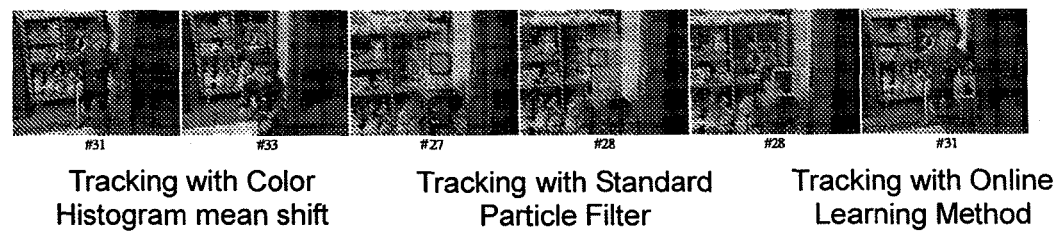
FIG. 10 shows the condition of tracking the 5 fps video with other existing technical methods under various conditions.
Figure 11:
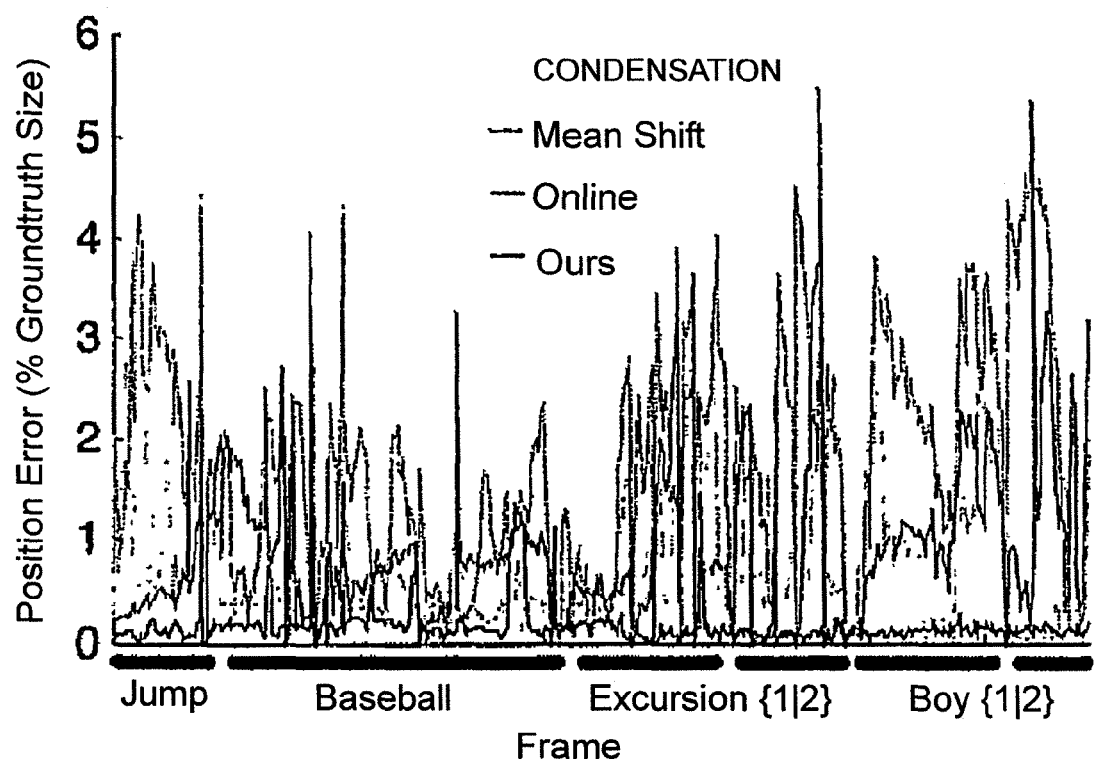
FIG. 11 shows the error curves of tracking positions in different tracking methods.

Methods for the comparison experiment include: the standard particle filter, a color histogram mean shift (OpenCV library function [22] is used during the experiment), a tracking algorithm [14] for the online selection of Haar-like characters, and the algorithm of the present invention. Video used in the experiment is manually calibrated with ground truth. They are all shot by hand-held cameras, and down sampled to 5 fps, wherein baseball.mpg (FIGS. 7 and 8) and hopping-.mpg show persons in motion; excursion1.mpg and excursion2.mpg (FIGS. 1 and 6) show that several persons walk through a passage; and boy1.mpg and boy2.mpg (FIGS. 9 and 10) show playing children. The test video, totally including 2676 frames, is used for testing the effects of algorithms under the condition of targets and cameras with abrupt or violent motion and low frame rate. The tracking error curve is shown in FIG. 11, and the average error and the tracking rates are shown in table 4. The tracking effect of the algorithm of the present invention is superior to that of other algorithms in the comparison experiment at low frame rate.

Table 4 shows the comparison between the accuracy rates of the algorithm of the present invention and other methods. The tracking errors are normalized according to the size of the actual target, and the tracking succeeds when both the position errors and the scale errors are less than 0.5.

TABLE 4

Comparison between the Accuracy Rates of the Algorithm of the Present Invention and Other Methods

| Algorithm | Mean Position Error | Mean Scale Error | Tracking Success Rate |
| --- | --- | --- | --- |
| Standard Particle Filter | 0.7592 | 0.2654 | 48.65% |
| Color Histogram mean shift | 1.7808 | 0.3802 | 8.74% |
| Online Learning[14] | 0.9167 | 0.2869 | 32.06% |
| Method of the Present Invention | 0.1641 | 0.2079 | 94.39% |

Figure 7:
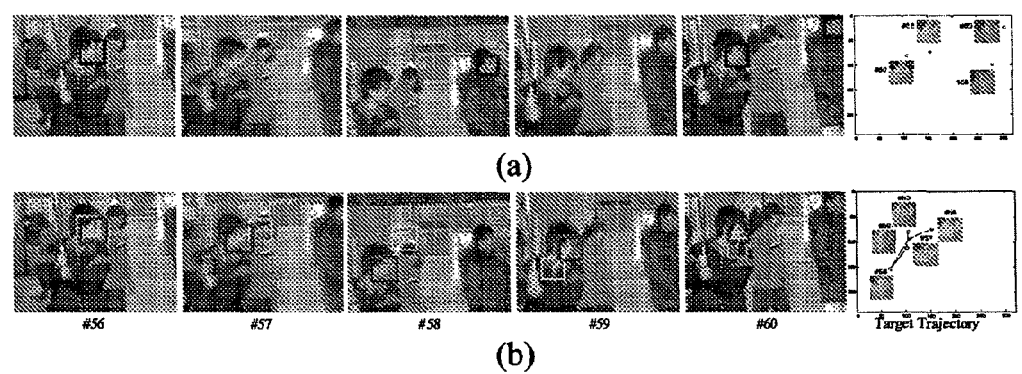
FIG. 7 shows the comparison between the tracking method of the present invention and a complete offline learning method, wherein (a) shows that detection may be omitted because of blur motion in offline face detection, and there is no method for correlating the same target, and (b) shows the tracking of the abrupt motion of a video camera and video with blur motion by the method of the present invention (the light grey rectangular frame represents the target position in the previous frames)
Figure 8:
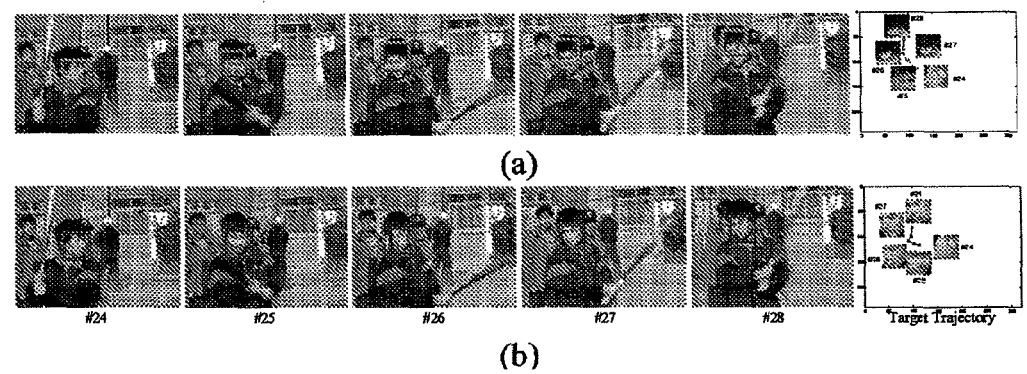
FIG. 8 shows the comparison between the method of the present invention and a complete online learning method, wherein (a) shows that the tracking with the complete online learning tracking algorithm can be used to observe the drift phenomenon of the model, and (b) shows the process of tracking the quick pose change of the target with the method of the present invention (from the right full lateral side to the left lateral side in five frames)

Discussion on the results of the comparison experiments is given as follows:

First, the effect of combining offline models and online models is discussed. In FIGS. 7 and 8, we select two challengeable video fragments for contrast. The first example shows the camera with abrupt motion, causing the abrupt motion of the target and the motion blur of the appearance in the video. By using the face detector (the observation model III of the present invention) performed offline training, we can observe leak check occurs during motion blur; besides, the offline model just can be used for detection, but cannot connect the face belonging to the same target in the sequence. The algorithm of the present invention however can be successfully used for tracking, and the online models can adapt changes (blur) in the target appearance. The other example shows fast pose changes (the face turns more than 120 degrees in five frames). The algorithm of the present invention can accurately track the position of the target. Comparatively, the tracking algorithm only adopting online knowledge can generate "drift" phenomenon. In essence, error accumulation cannot be corrected because of no prior knowledge for constraint. These conditions are common in the experiments of the present invention, which also indirectly explains the necessity of combining the online models and the offline models.

The other problem is multiple target tracking. We do not create a multiple target tracker, but separately use single-target trackers for several targets. We try multiple-target tracking mainly aiming at observing the capacity of the online models for distinguishing different targets. Ideally, the offline models just can distinguish faces and non-faces, but the online models should have the capability to gradually learn the knowledge of distinguishing different targets. Shown in FIG. 6, the likelihood given by the online observation models for its own tracking object is higher than that for two other adjacent faces. However, the likelihood in the positions of faces, whether they are target faces or not, is higher in general. That is to say, the online observation models have a certain but not strong capacity for distinguishing different targets. The possible reasons include: firstly, the character set of the online models is selected offline with the selection standard of capacity for distinguishing faces from non-faces so that the capacity for distinguishing different faces is not necessarily strong; secondly, the time for training the online models is limited so that it is difficult for the online models to fast grasp the differences between faces.

Figure 16:
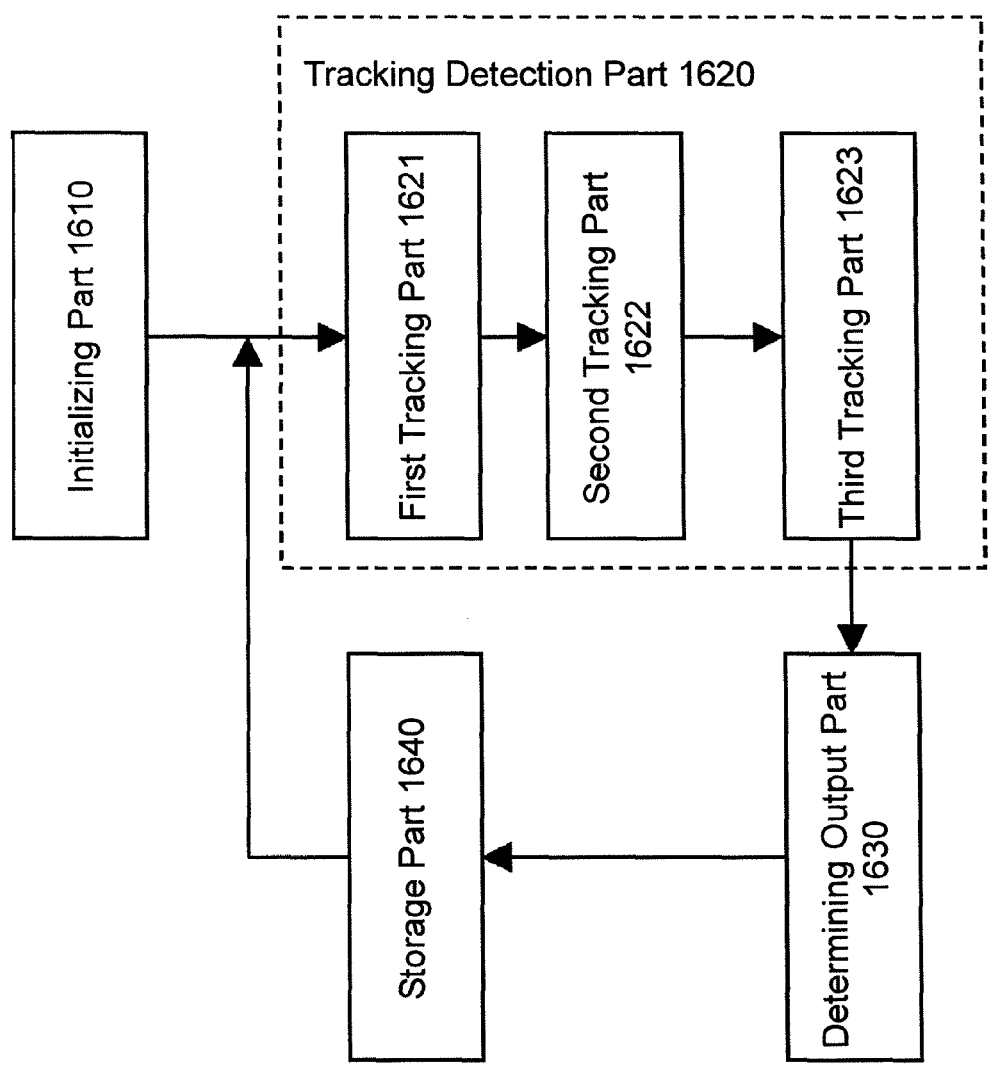
FIG. 16 shows a schematic block diagram of the tracking device combining three observation models according to the present invention.

The tracking method of the present invention based on the cascade particle filter is described as above. The present invention also provides a tracking device for performing the tracking method with brief description as follows:

FIG. 16 shows a tracking device 1600 of the present invention, which is based on the cascade particle filter and is suitable for low frame rate video. The tracking device tracks and detects the specific subject in the frame image of the video sequence by utilizing three observation models with different life spans.

The tracking device 1600 includes: an initializing part 1610 which detects a character part in the first frame image of the video sequence, and obtains an initial sample set including multiple target samples by performing Gaussian random sampling around the detected character part; a tracking detection part 1620 which tracks and detects the position and the size of the target in the input $t^{th}$ frame image, wherein t is a natural number, representing the serial number of the frame image; a determining output part 1630 which determines whether the detection result of the tracking detection part is the target to be tracked, if yes, outputs the weighted average of the size and the position of the sample set of the target sample to be used as the size and the position of the target in the current frame; if not, discards the candidate target; and a storage part 1640 which stores the determining output result of the determining output part for tracking and detecting the next frame image.

The tracking detection part 1620 includes: a first tracking part 1621 which performs online learning to the observation model I in the frame image by utilizing the one frame image prior to the input $t^{th}$ frame image, and then updates the weight of $N_1$ samples in the $t^{th}$ frame image, wherein $N_1$ is a natural number; a second tracking part 1622 which performs online learning on the observation model II in the frame image by utilizing the five frame images prior to the input $t^{th}$ frame image, and then updates the weight of $N_2$ samples resampled based on the samples in the $t^{th}$ frame image which are resampled based on the sampling weight updated by the first tracking part, wherein $N_2$ is a natural number; and a third tracking part 1623 which performs offline training, and then updates the weight of $N_3$ samples resampled based on the samples updated by the second tracking part in the $t^{th}$ frame image, wherein $N_3$ is a natural number.

The determining output part 1630 judges whether the sampling weight finally updated by the third tracking part 1623 exceeds the preset threshold. If it exceeds the threshold, output the weighted average of the size and the position of the sample set of the target sample to be used as the size and the position of the target in the current frame; if it does not exceed the first threshold, discard the candidate target.

The details of the construction and the learning and training processes of the adopted three observation models are the same as above, so no details are given here.

There is the detailed description of the preferred embodiments of the present invention referring to the drawings. But engineers in the field should know that the selected and described embodiments are only used for optimally explaining the principle and the practical application of the present invention, while the present invention is not limited to the embodiments. The present invention can be changed and modified in various ways under the condition of not exceeding the limited invention range of claims and other equivalents. The embodiments provided by the present invention in the examples above aim at faces and heads, but the present invention is not limited to faces and heads, and can be applied to other objects (such as other parts of human bodies, automobiles, pedestrians, etc.).

Particularly, the present invention can be implemented in the following ways.

One aspect of the present invention provides a tracking method for specific subjects in the low frame rate video, which tracks and detects the specific subject in the frame image of the video sequence by utilizing m observation models with different life spans, wherein m is a natural number.

The tracking method for specific subjects includes the following steps:
(a) detecting a character part in the first frame image of the video sequence, and obtaining the initial sample set including multiple specific subject samples by performing Gaussian random sampling around the detected character part;
(b) performing online learning or offline training to the $k^{th}$ observation model by utilizing the $D_k$ frame image prior to the input $t^{th}$ frame image, wherein t is a natural number, representing the serial number of the frame image; k is a natural number, representing the serial number of the observation models; and $D_k$ is a natural number, representing the life span of the $k^{th}$ observation model;
(c) aiming at the $t^{th}$ frame image, updating the sampling weight of the specific subject samples by orderly utilizing the m observation models performing the online learning or the offline training;
(d) judging whether the sampling weight finally updated by the $m^{th}$ observation model in step (c) exceeds the preset first threshold; if it exceeds the first threshold, outputs the weighted average of the size and the position of the sample set of the specific subject samples to be used as the size and the position of the specific subject in the current frame; if it does not exceed the first threshold, discards the candidate target; and
(e) repeating step (b) to (d) to the $t+1^{th}$ frame image.

In the above tracking method for specific subjects, it is preferred that the life span $D_k$ of the $k^{th}$ observation model is increased with the increase of k.

In the above tracking method for specific subjects, it is preferred to set the sample number corresponding to the $k^{th}$ observation model as $N_k$, wherein $N_k$ is a natural number and is decreased with the increase of k.

In the above tracking method for specific subjects, it is preferred to perform the online learning on previous m−1 observation models and the offline training on the $m^{th}$ observation model.

In the above tracking method for specific subjects, it is preferred to perform the online learning on the previous two observation models and the offline training on the observation model III by utilizing three observation models.

In the above tracking method for specific subjects, the process of performing the online learning on the observation model I includes the following steps:
(f) collecting the positive example samples and the counterexample samples from the previous $D_1$ frame images;
(g) determine various parameters adopted by the observation model I based on the collected positive example samples and counterexample samples.

In the above tracking method for specific subjects, it is preferred that the observation model I is a Fisher linear discriminant classifier.

In the above tracking method for specific subjects, it is preferred that the life span $D_1$ of the observation model I is one frame image.

In the above tracking method for specific subjects, it is preferred that the observation model I adopts five Haar-like characters selected offline.

In the above tracking method for specific subjects, it is preferred that the positive example samples are selected from images in the area near the tracked specific subject, and the counterexample samples are selected from images far away from the specific subject in the area which is around the tracked specific subject and is twice as large as the specific subject.

In the above tracking method for specific subjects, the output of the observation model I smoothed by the Sigmoid function is:

$$p(z_1 \mid x) \propto \frac{1}{1+\exp(-(w^T f(x) - \eta))},$$

wherein x represents the state variable of the tracked specific subject, $z_1$ represents the observed quantity adopted by the observation model I, w represents the projection weight vector of the Fisher linear discriminant classifier, f(x) represents the input 5-D character vector, and $\eta$ represents the classification threshold.

In the above tracking method for specific subjects, the process of performing the online learning to the observation model II includes the following steps:

(h) collecting the positive example samples and the counterexample samples from the previous $D_2$ frame images, filtering the collected samples by the observation model I, and using the reserved samples as the training samples;

(i) selecting the counterexample samples whose output likelihood is greater than the second threshold in the observation model II from the reserved counterexample samples;

(j) based on the selected counterexample samples and the reserved positive example samples, constructing a new Fisher linear discriminant classifier, and adding the new Fisher linear discriminant classifier to the original weak classifier set until the number of weak classifiers exceeds the maximum set value or the overwhelming majority of the counterexample samples can be excluded;

(k) selecting the weak classifiers from the weak classifier set by utilizing the Discrete AdaBoost algorithm so as to form the strong classifier; and (l) deleting the weak classifiers unadopted in the frames of a preset number from the weak classifier set.

In the above tracking method for specific subjects, it is preferred that the life span $D_2$ of the observation model II is five frame images.

In the above tracking method for specific subjects, the output of the strong classifier is:

$$b(x) = \frac{\sum_{q \in Q} \alpha_q \text{sign}(w_q^T f_q(x) - \eta_q)}{\sum_{q \in Q} \alpha_q},$$

wherein x represents the state variable of the tracked specific subject, Q represents the set of a selected group of weak classifiers, $\alpha_q$ represents the weight corresponding to any weak classifier q in Q, $w_q$ represents the LDA projection vector of the weak classifiers q, $f_q$ represents characters adopted aiming at the weak classifiers q, and $\eta_q$ represents the classification threshold aiming at the weak classifiers q.

In the above tracking method for specific subjects, the output of the observation model II smoothed by the Sigmoid function is:

$$p(z_2 \mid x) \propto \frac{1}{1+\exp(-b(x))},$$

wherein $z_2$ represents the observed quantity of the observation model II.

In the above tracking method for specific subjects, it is preferred that the observation model III is formed by strong classifiers obtained by learning of multiple-vector propulsion algorithms.

In the above tracking method for specific subjects, it is preferred that the observation model III is a dendritic multi-view face detector.

In the above tracking method for specific subjects, the output of the observation model III is:

$$p(z_3 \mid x) \propto \frac{1}{1+\phi_h \exp(-c)},$$

wherein $z_3$ represents the observed quantity of the observation model III; h represents the layer number of the last strong classifier through which the input sample x passes; $\phi_h$ represents the ratio of the prior probability of the counterexample samples corresponding to the strong classifier to the positive example samples, and is decreased with the increase of h, showing that the larger the layer number of the classifier through which x passes, the higher the probability that $\phi_h$ belongs to positive examples is; and c represents the confidence level output by the last strong classifier through which x passes.

Another aspect of the present invention provides a tracking device for specific subjects in the low frame rate video, which tracks and detects the specific subject in the frame image of the video sequence by utilizing three observation models with different life spans.

The tracking device for the specific subject includes:

an initializing part which detects a character part in the first frame image of the video sequence, and obtains an initial sample set including multiple specific subject samples by performing Gaussian random sampling around the detected character part;

a tracking detection part which tracks and detects the position and the size of the specific subject in the input $t^{th}$ frame image, wherein t is a natural number, representing the serial number of the frame image;

a determining output part which determines whether the detection result of the tracking detection part is the tracked specific subject; if yes, outputs the weighted average of the size and the position of the sample set of the specific subject sample to be used as the size and the position of the specific subject in the current frame; if not, discards the candidate target; and a storage part which stores the determining output result of the determining output part for tracking and detecting the next frame image, wherein the tracking detection part includes:

a first tracking part which performs online learning to the observation model I in the frame image by utilizing the $D_1$ frame image prior to the input $t^{th}$ frame image, and then updates the weight of $N_1$ samples in the $t^{th}$ frame image; $D_1$ is a natural number, representing the life span of the observation model I, and $N_1$ is a natural number;

a second tracking part which performs online learning to the observation model II in the frame image by utilizing the $D_2$ frame images prior to the input $t^{th}$ frame image, and then updates the weight of $N_2$ samples in the $t^{th}$ frame image which are resampled based on the sampling weight updated by the first tracking part; and $D_2$ is a natural number, representing the life span of the observation model II, and $N_2$ is a natural number;

a third tracking part which performs offline training, and then updates the weight of $N_3$ samples in the $t^{th}$ frame image which are resampled based on the sampling weight updated by the second tracking part, and $N_3$ is a natural number, the determining output part judges whether the sampling weight finally updated by the third tracking part exceeds the preset first threshold; if it exceeds the first threshold, outputs the weighted average of the size and the position of the sample set to be used as the size and the position of the specific subject in the current frame; if it does not exceed the first threshold, discards the candidate target.

In the above tracking device for specific subjects, it is preferred that the life span $D_1$ of the observation model I is smaller than the life span $D_2$ of the observation model II.

In the above tracking device for specific subjects, it is preferred that the life span $D_1$ of the observation model I is one frame image.

In the above tracking device for specific subjects, it is preferred that the life span $D_2$ of the observation model II is five frame images.

In the above tracking device for specific subjects, it is preferred that the sample number $N_1$ aiming at the first tracking part>the sample number $N_2$ aiming at the second tracking part>the sample number $N_3$ aiming at the third tracking part.

In the above tracking method for specific subjects, the process of performing the online learning to the observation model I includes the following steps:

collecting the positive example samples and the counterexample samples from the previous $D_1$ frame images; and determining various parameters adopted by the observation model I based on the collected positive example samples and counterexample samples.

In the above tracking device for specific subjects, it is preferred that the observation model I is a Fisher linear discriminant classifier.

In the above tracking device for specific subjects, it is preferred that the observation model I adopts five Haar-like characters selected offline.

In the above tracking device for specific subjects, it is preferred that the positive example samples are selected from images in the area near the tracked specific subject, and the counterexample samples are selected from images far away from the specific subject in the area which is around the tracked specific subject and is twice as large as the specific subject.

In the above tracking device for specific subjects, the output of the observation model I smoothed by the Sigmoid function is:

$$p(z_1 \mid x) \propto \frac{1}{1 + \exp(-(w^T f(x) - \eta))},$$

wherein x represents the state variable of the tracked specific subject, $z_1$ represents the observed quantity adopted by the observation model I, w represents the projection weight vector of the Fisher linear discriminant classifier, f(x) represents the input 5-D character vector, and $\eta$ represents the classification threshold.

In the above tracking device for specific subjects, the process of performing the online learning to the observation model II includes the following steps:

collecting the positive example samples and the counterexample samples from the previous $D_2$ frame images, filtering the collected samples by the first tracking part, and using the reserved samples as the training samples;

selecting the counterexample samples whose output likelihood is greater than a second threshold in the observation model II from the reserved counterexample samples;

based on the selected counterexample samples and the reserved positive example samples, constructing a new Fisher linear discriminant classifier, and adding the new Fisher linear discriminant classifier to the original weak classifier set until the number of weak classifiers exceeds the maximum set value or the overwhelming majority of the counterexample samples can be excluded;

selecting the weak classifiers from the weak classifier set by utilizing the Discrete AdaBoost algorithm so as to form the strong classifier; and deleting the weak classifiers unadopted in the frames of preset number from the weak classifier set.

In the tracking device for specific subjects, the output of the strong classifier is:

$$b(x) = \frac{\sum_{q \in Q} \alpha_q \operatorname{sign}(w_q^T f_q(x) - \eta_q)}{\sum_{q \in Q} \alpha_q},$$

wherein x represents the state variable of the tracked specific subject, Q represents the set of a selected group of weak classifiers, $\alpha_q$ represents the weight corresponding to any weak classifiers q in Q, $w_q$ represents the LDA projection vector of the weak classifiers q, $f_q$ represents characters adopted aiming at the weak classifiers q, and $\eta_q$ represents the classification threshold aiming at the weak classifiers q.

In the tracking device for specific subjects, the output of the observation model II smoothed by the Sigmoid function is:

$$p(z_2 \mid x) \propto \frac{1}{1 + \exp(-b(x))},$$

wherein $z_2$ represents the observed quantity of the observation model II.

In the above tracking device for specific subjects, it is preferred that the observation model III is formed by strong classifiers obtained by learning of multiple-vector propulsion algorithms.

In the above tracking device for specific subjects, it is preferred that the observation model III is a dendritic multi-view face detector.

In the above tracking device for specific subjects, the output of the observation model III is:

$$p(z_3 \mid x) \propto \frac{1}{1 + \phi_h \exp(-c)},$$

wherein $z_3$ represents the observed quantity of the observation model III; h represents the layer number of the last strong classifier through which the input sample x passes; $\phi_h$ represents the ratio of the prior probability of the counterexample samples corresponding to the strong classifier to the positive example samples, and is decreased with the increase of h, showing that the larger the layer number of the classifier through which x passes, the higher the probability that $\phi_h$ belongs to positive examples is; and c represents the confidence level output the last strong classifier through which x passes.

In addition, the purpose of the present invention can also be achieved by computer programs executing the operation above with computers, or single chip computers, etc. according to the embodiments of the present invention.

Besides, it should be known that each operation in the embodiments can be executed by special circuits or lines (for example, discrete logic gates which is formed by connecting the circuits or the lines to execute the special function), by a program instruction executed by one or more processor(s), or the combination thereof. Therefore, the multiple aspects can be implemented in various forms, and all the forms can be regarded as in the range of the described content. For each of the multiple aspects, here the embodiment in any of the forms can refer to "constructed for executing the logic of the operation" or optionally "execute or can execute the logic of the operation".

Furthermore, according to the embodiments of the present invention, the purpose of the present invention can also be achieved by a computer readable medium which stores the above programs. The computer readable medium can be any device which can include, store, inform, transmit or transfer programs for use of executive systems, equipment or devices, or can be combined with instruction executive systems, equipment or devices. The computer readable medium, for example, can be but not limited to electronic, magnetic, optical, electromagnetic, infrared or semiconductor systems, equipment, devices or a transmission medium, more specifically (non-exhaustion), includes electric connectors with one or more conducting wires, portable computer disks, random access memories (RAM), read-only memories (ROM), erasable programmable read-only memories (EPROM or flash memories), optical fibers and portable CD read-only memories (CDROM).

The present invention constructs different classifiers as observation models and combines the online classifiers and the offline classifiers for use on the basis of statistic learning so as to improve the stability of the algorithms. The application of multiple complementary observation models in the same image space not only can enhance the distinguishing capability of the observation models, but also can avoid errors caused by down sampling images. Thus, for tracking targets in the low frame rate video or object with abrupt motion, the tracking method and the tracking device of the present invention can reduce the search range by capturing and using time sequence information in the video to precisely identify the targets by detection algorithms so that the target or object can be fast and accurately tracked.

References mentioned above are incorporated in the description by reference in the same way as the references are comprehensively described.

[1] M. Isard and A. Blake. Condensation—conditional density propagation for visual tracking. International Journal of Computer Vision, 28 (1):5-28, 1998.
[2] D. Comaniciu, V. Ramesh, and P. Meer. Real-time tracking of non-rigid objects using meanshift. In IEEE Conference on Computer Vision and Pattern Recognition, 2000.
[3] C. Tomasi and T. Kanade, Detection and tracking of point features. Technical Report CMU-CS-91-132, Carnegie Mellon University, 1991.
[4] K. Okuma, A Taleghani, D. Freitas, J. J. Little, and D. G. Lowe. A Boosted particle filter; Multitarget detection and tracking. In European Conference on Computer Vision, 2004.
[5] C. Liu, H. Y. Shum, and C. Zhang. Hierarchical shape modeling for automatic face localization. In European Conference on Computer Vision, 2002.
[6] F. Porikli and O. Tuzel, Object tracking in low-frame-rate video. SPIE Image and Video Communications and Processing, 5685:72-79, 2005.
[7] M. Han, A. Sethi, W. Hua, and Y. Gong. A detection-based multiple object tracking method. In IEEE International Conference on Image Processing, 2004.
[8] R. Kaucic, A. G. A. Perera, G. Brooksby, J. Kaufholed, and A. Hoogs. A unified framework for tracking through occlusions and across sensor gaps. In IEEE Conference on Computer Vision and Pattern Recognition, 2005.
[9] G. Hua and Y. Wu. Multi-scale visual tracking by sequential belief propagation. In IEEE Conference on Computer Vision and Pattern Recognition, 2004.
[10] S. Birchfield. Source code of the klt feature tracker. http://www.ces.clemson.edu/~stb/klt/, 2006.
[11] J. Sullivan, A. Blake, M. Isard, and J. MacCormick. Object localization by bayesian correlation. In International Conference on Computer Vision, 1999.
[12] S. Acvidan, Ensamble tracking. IEEE Transactions on Pattern Analysis and Machine Intelligence, 29(2):261-271, 2007.
[13] P. Viola and M. Jones. Robust real-time object detection. In IEEE Workshop on Statistical and Theories of Computer Vision, 2001.
[14] J. Wang, X. Chen, and W. Gao. Online selecting discriminative tracking features using particle filter. In IEEE Conference on Computer Vision and Pattern Recognition, 2005.
[15] B. Wu, H. Ai, C. Huang, and S. Lao. Fast rotation invariant multi-view face detection based on real adaboost. In IEEE International Conference on Automatic Face and Gesture Recognition, 2004.
[16] Y. Freund and R. E. Schapire. Experiments with a new boosting algorithm. In International Conference on Machine Learning, 1996.
[17] Yuan Li, Haizhou Ai, Chang Huang, Shihong Lao. Robust Head Tracking Based on a Multi-State Particle Filter, IEEE International Conference on Automatic Face and Gesture Recognition (FGR06), Southampton, UK, 2006.
[18] Richard O. Duda, Peter E. Hart, Davie G. Stork. Pattern Classification, Second Edition. John Wiley & Sons, 2001 (ISBN:0-471-05669-3).
[19] J. S. Liu. Monte Carlo Strategies in Scientific Computing. Springer, N.Y., 1994 (ISBN: 0-387-95230-6).
[20] C. Huang, H. Ai, Y. Li, and S. Lao. Vector boosting for rotation invariant multi-view face detection. In International Conference on Computer Vision, 2005.
[21] C. Yan, R. Duraiswami, and L. Davis. Fast multiple object tracking via a hierarchical particle filter. In International Conference on Computer Vision 2005.
[22] Inter opencv library. http://www.sourceforge.net/projects/opencvlibrary.

The invention claimed is:

1. A tracking method for tracking a specific subject in a frame image of a video sequence by using three observation models I, II and III,
the tracking method being implemented on a microprocessor which performs the steps comprising:
(a) detecting one character part from a frame image of a video sequence;
(b) performing online learning on observation model I with at least one frame image of $D_1$ frame images prior to an $t-1^{th}$ frame image that is input, performing online learning on observation model II with at least one frame image of $D_2$ frame images prior to the $t-1^{th}$ frame image that is input, and performing offline training on observation model III with at least one frame image of $D_3$ frame images prior to the t−1$^{th}$ frame image that is input; wherein t is a natural number, representing the serial number of the frame image; $D_1$, $D_2$, and $D_3$, are natural numbers representing a life span of observation models I, II and III, respectively;

(c) aiming at a t$^{th}$ frame image, using the three observation models, in order I, II, III, to update a sampling weight of specific subject samples in a sample set representing a candidate target;

(d) judging whether the sampling weight finally updated from the observation model III in step (c) exceeds a first preset threshold; if it exceeds the first threshold, outputting a size and a position of the specific subject in the t$^{th}$ frame calculated based on the size and position of the specific subject samples in the sample set; if it does not exceed the first threshold, discarding the candidate target; and (e) performing steps (b) to (d) on a t+1$^{th}$ frame image, wherein $D_1$ is less than $D_2$ which is less than $D_3$, wherein $N_1$, $N_2$, $N_3$ are natural numbers representing a number of the specific subject samples in the sample set used for observation models I, II and III, respectively, and $N_1$ is greater than $N_2$ which is greater than $N_3$, and wherein the process of performing online learning on observation model I includes the steps of:

(f) collecting positive example samples and counterexample samples from previous $D_1$ frame images; and (g) based on the collected positive example samples and counterexample samples, determining various parameters adopted in the observation model I.

2. The tracking method for tracking a specific subject according to claim 1, wherein the observation model I is a Fisher linear discriminant classifier.

3. The tracking method for tracking a specific subject according to claim 2, wherein the life span $D_1$ of the observation model I has one frame image.

4. The tracking method for tracking a specific subject according to claim 3, wherein the observation model I adopts 5 Haar-like characters selected offline.

5. The tracking method for tracking a specific subject according to claim 4, wherein the positive example samples are selected from images in an area near the tracked specific subject, and the counterexample samples are selected from images far away from the specific subject in an area which is around the tracked specific subject and is twice as large as the specific subject.

6. The tracking method for tracking a specific subject according to claim 5, wherein the output of the observation model I smoothed by a Sigmoid function is:

$$p(z_1 \mid x) \propto \frac{1}{1+\exp(-(w^T f(x)-\eta))},$$

wherein x represents the state variable of the tracked specific subjects, $z_1$ represents the observed quantity adopted by the observation model I, w represents the weight vector of the projection of the Fisher linear discriminant classifier, f(x) represents the input 5-D character vector, and η represents the classification threshold.

7. A tracking method for tracking a specific subject in a frame image of a video sequence by using three observation models I, II and III, the tracking method being implemented on a microprocessor which performs the steps comprising:

(a) detecting one character part from a frame image of a video sequence;

(b) performing online learning on observation model I with at least one frame image of $D_1$ frame images prior to an t−1$^{th}$ frame image that is input, performing online learning on observation model II with at least one frame image of $D_2$ frame images prior to the t−1$^{th}$ frame image that is input, and performing offline training on observation model III with at least one frame image of $D_3$ frame images prior to the t−1$^{th}$ frame image that is input; wherein t is a natural number, representing the serial number of the frame image; $D_1$, $D_2$, and $D_3$, are natural numbers representing a life span of observation models I, II and III, respectively;

(c) aiming at a t$^{th}$ frame image, using the three observation models, in order I, II, III, to update a sampling weight of specific subject samples in a sample set representing a candidate target;

(d) judging whether the sampling weight finally updated from the observation model III in step (c) exceeds a first preset threshold; if it exceeds the first threshold, outputting a size and a position of the specific subject in the t$^{th}$ frame calculated based on the size and position of the specific subject samples in the sample set; if it does not exceed the first threshold, discarding the candidate target; and (e) performing steps (b) to (d) on a t+1$^{th}$ frame image, wherein $D_1$ is less than $D_2$ which is less than $D_3$, wherein $N_1$, $N_2$, $N_3$ are natural numbers representing a number of the specific subject samples in the sample set used for observation models I, II and III, respectively, and $N_1$ is greater than $N_2$ which is greater than $N_3$, and wherein the process of performing online learning on an observation model II includes the steps of:

(h) collecting positive example samples and counterexample samples from previous $D_2$ frame images, filtering the collected samples by using the observation model I, and using reserved positive example samples and reserved counterexample samples as training samples;

(i) selecting the counterexample samples whose output likelihood is greater than a second threshold in the observation model II from the reserved counterexample samples;

(j) based on the selected counterexample samples and the reserved positive example samples, constructing a new Fisher linear discriminant classifier, and adding the new Fisher linear discriminant classifier to the original weak classifier set until the number of weak classifiers exceeds a maximum set value or the overwhelming majority of the counterexample samples can be excluded;

(k) selecting a weak classifier from the weak classifier set with a Discrete AdaBoost algorithm to form strong classifiers; and (l) deleting unadopted weak classifiers in the frames within a preset quantity from the weak classifier set.

8. The tracking method for tracking a specific subject according to claim 7, wherein the life span $D_2$ of the observation model II is five frame images.

9. The tracking method for tracking a specific subject according to claim 8, wherein the output of the strong classifiers is:

$$b(x) = \frac{\sum_{q \in Q} \alpha_q \mathrm{sign}(w_q^T f_q(x) - \eta_q)}{\sum_{q \in Q} \alpha_q},$$

wherein x represents the state variable of the tracked specific subjects, Q represents the set of the selected weak classifiers, $\alpha_q$ represents the weight corresponding to any weak classifier q in Q, $w_q$ represents the vector of LDA projection of the weak classifier q, $f_q$ represents the character adopted among in the weak classifier q, and $\eta_q$ represents the classification threshold aiming at the weak classifier q.

10. The tracking method for tracking a specific subject according to claim 9, wherein the output of the observation model II smoothed by the Sigmoid function is:

$$p(z_2 \mid x) \propto \frac{1}{1+\exp(-b(x))},$$

wherein $z_2$ represents the observed quantity of the observation model II.

11. A tracking method for tracking a specific subject in a frame image of a video sequence by using three observation models I, II and III, the tracking method being implemented on a microprocessor which performs the steps comprising:
(a) detecting one character part from a frame image of a video sequence;
(b) performing online learning on observation model I with at least one frame image of $D_1$ frame images prior to an t-$1^{th}$ frame image that is input, performing online learning on observation model II with at least one frame image of $D_2$ frame images prior to the t-$1^{th}$ frame image that is input, and performing offline training on observation model III with at least one frame image of $D_3$ frame images prior to the t-$1^{th}$ frame image that is input; wherein t is a natural number, representing the serial number of the frame image; $D_1$, $D_2$, and $D_3$, are natural numbers representing a life span of observation models I, II and III, respectively;
(c) aiming at a $t^{th}$ frame image, using the three observation models, in order I, II, III, to update a sampling weight of specific subject samples in a sample set representing a candidate target;
(d) judging whether the sampling weight finally updated from the observation model III in step (c) exceeds a first preset threshold; if it exceeds the first threshold, outputting a size and a position of the specific subject in the $t^{th}$ frame calculated based on the size and position of the specific subject samples in the sample set; if it does not exceed the first threshold, discarding the candidate target and
(e) performing steps (b) to (d) on a t+$1^{th}$ frame image, wherein $D_1$ is less than $D_2$ which is less than $D_3$,
wherein $N_1$, $N_2$, $N_3$ are natural numbers representing a number of the specific subject samples in the sample set used for observation models I, II and III, respectively, and $N_1$ is greater than $N_2$ which is greater than $N_3$, and
wherein the observation model III is formed by strong classifiers obtained by learning of multiple vector boosting algorithms,
wherein the observation model III is a dendritic multi-view face detector, and
wherein the output of the observation model III is:

$$p(z_3 \mid x) \propto \frac{1}{1+\phi_h \exp(-c)},$$

wherein $z_3$ represents the observed quantity of the observation model III; h represents the number of layers of the last strong classifier through which the input sample x passes; $\phi_h$ represents the ratio of the prior probability of the counterexample sample corresponding to the strong classifier to that of the positive example sample, $\phi_h$ is decreased with the increase of h, showing that the larger the layer number of the classifiers through which x passes, the higher the probability that $\phi_h$ belongs to positive examples is; and c represents the confidence level output by the last strong classifier through which x passes.

12. A tracking device which uses three observation models to track a specific subject in a frame image of a video sequence,
the tracking device comprising:
an initializing part which detects a character part in a frame image of a video sequence;
a tracking detection part which tracks and detects the position and size of a specific subject in an input $t^{th}$ frame image, wherein t is a natural number, representing the serial number of the frame image, wherein the tracking detection part includes:
a first tracking part which performs online learning on an observation model I in the frame image by utilizing least one of $D_1$ frame images prior to an input t-$1^{th}$ frame image, and then updates a sampling weight of $N_1$ samples in the $t^{th}$ frame image, wherein $D_1$ is a natural number, representing the life span of the observation model I, and $N_1$ is a natural number, wherein the life span $D_1$ of the observation model I has one frame image;
a second tracking part which performs online learning on an observation model II in the frame image by utilizing at least one of $D_2$ frame images prior to the input t-$1^{th}$ frame image, and then updates a sampling weight of $N_2$ samples in the $t^{th}$ frame image which are resampled based on the sampling weight updated by the first tracking part, wherein $D_2$ is a natural number representing the life span of the observation model II and $N_2$ is a natural number, wherein the life span $D_2$ of the observation model II has five frame images; and
a third tracking part which performs offline training, and then updates a sampling weight of $N_3$ samples in the $t^{th}$ frame image which are resampled based on the sampling weight updated by the second tracking part, and $N_3$ is a natural number;
a determining output part which determines whether the detection result of the tracking detection part is a tracked specific subject or not by judging whether the sampling weight finally updated by the third tracking part exceeds a first preset threshold; if it exceeds the first threshold, outputs a weighted average of the size and position of a sample set of specific subjects to be used as the size and position of the specific subject in the current frame; if not, discards the detection result of the tracking detection part as a candidate target; and
a storage part which stores the determining output result of the determining output part for tracking and detecting a next frame image, and
wherein the sample number $N_1$ aiming at the first tracking part is greater than the sample number $N_2$ aiming at the second tracking part which is greater than the sample number $N_3$ aiming at the third tracking part.

13. The tracking device for tracking a specific subject according to claim 12, wherein the process of performing online learning on the observation model I includes:
collecting positive example samples and counterexample samples from the previous $D_1$ frame image; and determining various parameters adopted in the observation model I based on the collected positive example samples and counterexample samples.

14. The tracking device for tracking a specific subject according to claim 13, wherein the observation model I is a Fisher linear discriminant classifier.

15. The tracking device for tracking a specific subject according to claim 14, wherein the observation model I adopts five Haar-like characters selected offline.

16. The tracking device for tracking a specific subject according to claim 15, wherein the positive example samples are selected from images in an area near the tracked specific subject, and the counterexample samples are selected from images far away from the specific subject in an area which is around the tracked specific subject and is twice as large as the specific subject.

17. The tracking device for tracking a specific subject according to claim 16, wherein the output of the observation model I smoothed by a Sigmoid function is:

$$p(z_1 \mid x) \propto \frac{1}{1 + \exp(-(w^T f(x) - \eta))},$$

wherein x represents the state variable of the tracked specific subjects, $z_1$ represents the observed quantity adopted by the observation model I, w represents the weight vector projection of the Fisher linear discriminant classifier, f(x) represents the input 5-D character vector, and η represents the classification threshold.

18. A tracking device which uses three observation models to track a specific subject in a frame image of a video sequence, the tracking device comprising:
an initializing part which detects a character part in a frame image of a video sequence;
a tracking detection part which tracks and detects the position and size of a specific subject in an input $t^{th}$ frame image, wherein t is a natural number, representing the serial number of the frame image, wherein the tracking detection part includes:
   a first tracking part which performs online learning on an observation model I in the frame image by utilizing least one of $D_1$ frame images prior to an input $t-1^{th}$ frame image, and then updates a sampling weight of $N_1$ samples in the $t^{th}$ frame image, wherein $D_1$ is a natural number, representing the life span of the observation model I, and $N_1$ is a natural number;
   a second tracking part which performs online learning on an observation model II in the frame image by utilizing at least one of $D_2$ frame images prior to the input $t-1^{th}$ frame image, and then updates a sampling weight of $N_2$ samples in the $t^{th}$ frame image which are resampled based on the sampling weight updated by the first tracking part, wherein $D_2$ is a natural number, representing the life span of the observation model II, and $N_2$ is a natural number; and
   a third tracking part which performs offline training, and then updates a sampling weight of $N_3$ samples in the $t^{th}$ frame image which are resampled based on the sampling weight updated by the second tracking part, and $N_3$ is a natural number;
a determining output part which determines whether the detection result of the tracking detection part is a tracked specific subject or not by judging whether the sampling weight finally updated by the third tracking part exceeds a first preset threshold; if it exceeds the first threshold, outputs a weighted average of the size and position of a sample set of specific subjects to be used as the size and position of the specific subject in the current frame; if not, discards the detection result of the tracking detection part as a candidate target; and
a storage part which stores the determining output result of the determining output part for tracking and detecting a next frame image, and
wherein the process of performing online learning on the observation model II includes:
collecting positive examples samples and counterexample samples from previous $D_2$ frame images, filtering the collected samples by using the first tracking part, and using reserved positive example samples and reserved counterexample samples as training samples;
selecting the counterexample samples whose output likelihood is greater than a second threshold in the observation model II from the reserved counterexample samples;
based on the selected counterexample samples and the reserved positive example samples, constructing a new Fisher linear discriminant classifier, and adding the new Fisher linear discriminant classifier to the original weak classifier set until the number of weak classifiers exceeds a maximum set value or the overwhelming majority of the counterexample samples can be excluded;
selecting a weak classifier from the weak classifier set with a Discrete AdaBoost algorithm to form strong classifiers; and
deleting unadopted weak classifiers in the frames within a preset quantity from the weak classifier set.

19. The tracking device for tracking a specific subject according to claim 18, wherein the output of the strong classifiers is:

$$b(x) = \frac{\sum_{q \in Q} \alpha_q \mathrm{sign}(w_q^T f_q(x) - \eta_q)}{\sum_{q \in Q} \alpha_q},$$

wherein x represents the state variable of the tracked specific subjects, Q represents the selected weak classifier set, $\alpha_q$ represents the weight corresponding to any weak classifier q in Q, $w_q$ represents the vector of the LDA projection of the weak classifier q, $f_q$ represents the adopted character aiming at the weak classifier q, and $\eta_q$ represents the classification threshold aiming at the weak classifier q.

20. The tracking device for tracking a specific subject according to claim 19, wherein the output of the observation model II smoothed by the Sigmoid function is:

$$p(z_2 \mid x) \propto \frac{1}{1 + \exp(-b(x))},$$

wherein $z_2$ represents the observed quantity of the observation model II.

21. A tracking device which uses three observation models to track a specific subject in a frame image of a video sequence, the tracking device comprising:
an initializing part which detects a character part in a frame image of a video sequence;
a tracking detection part which tracks and detects the position and size of a specific subject in an input $t^{th}$ frame image, wherein t is a natural number, representing the serial number of the frame image, wherein the tracking detection part includes:
- a first tracking part which performs online learning on an observation model I in the frame image by utilizing least one of $D_1$ frame images prior to an input $t-1^{th}$ frame image, and then updates a sampling weight of $N_1$ samples in the $t^{th}$ frame image, wherein $D_1$ is a natural number, representing the life span of the observation model I, and $N_1$ is a natural number;
- a second tracking part which performs online learning on an observation model II in the frame image by utilizing at least one of $D_2$ frame images prior to the input $t-1^{th}$ frame image, and then updates a sampling weight of $N_2$ samples in the $t^{th}$ frame image which are resampled based on the sampling weight updated by the first tracking part, wherein $D_2$ is a natural number, representing the life span of the observation model II, and $N_2$ is a natural number; and
- a third tracking part which performs offline training, and then updates a sampling weight of $N_3$ samples in the $t^{th}$ frame image which are resampled based on the sampling weight updated by the second tracking part, and $N_3$ is a natural number;
- a determining output part which determines whether the detection result of the tracking detection part is a tracked specific subject or not by judging whether the sampling weight finally updated by the third tracking part exceeds a first preset threshold; if it exceeds the first threshold, outputs a weighted average of the size and position of a sample set of specific subjects to be used as the size and position of the specific subject in the current frame; if not, discards the detection result of the tracking detection part as a candidate target; and
- a storage part which stores the determining output result of the determining output part for tracking and detecting a next frame image, and wherein the observation model III is formed by strong classifiers obtained by learning of multiple vector boosting algorithms, wherein the observation model III is a dendritic multi-view face detector, wherein the output of the observation model III is:

$$p(z_3 \mid x) \propto \frac{1}{1 + \phi_h \exp(-c)},$$

wherein $z_3$ represents the observed quantity of the observation model III; h represents the number of layers of the last strong classifier through which the input sample x passes; $\phi_h$ represents the ratio of the prior probability of the counterexample sample corresponding to the strong classifier to that of the positive example sample, and $\phi_h$ is decreased with increase of h, showing that the larger the layer number of the classifiers through which x passes, the higher the probability that $\phi_h$ belongs to positive examples is; and c represents the confidence level output by the last strong classifier through which x passes.

* * * * *

UNITED STATES PATENT AND TRADEMARK OFFICE
CERTIFICATE OF CORRECTION

PATENT NO. : 8,548,195 B2  Page 1 of 1
APPLICATION NO. : 12/664588
DATED : October 1, 2013
INVENTOR(S) : Ai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this
Fifteenth Day of September, 2015

Michelle K. Lee
*Director of the United States Patent and Trademark Office*